(12) United States Patent
Munguia et al.

(10) Patent No.: US 6,381,644 B2
(45) Date of Patent: *Apr. 30, 2002

(54) INTEGRATED PROXY INTERFACE FOR WEB BASED TELECOMMUNICATIONS NETWORK MANAGEMENT

(75) Inventors: Wayne J. Munguia; Robert A. Pfister; Charles A. Suscheck, all of Colorado Springs, CO (US)

(73) Assignee: MCI WorldCom, Inc., Jackson, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,513

(22) Filed: Sep. 24, 1998

Related U.S. Application Data

(60) Provisional application No. 60/060,655, filed on Sep. 26, 1997.

(51) Int. Cl.[7] ........................ G06F 15/173; G06F 15/16
(52) U.S. Cl. ........................ 709/225; 709/229; 713/201
(58) Field of Search .................... 709/220, 226, 709/229, 221, 203, 205, 223; 379/201; 713/201

(56) References Cited

U.S. PATENT DOCUMENTS 4,160,129 A    7/1979   Peyser et al. .......... 379/220.01
4,345,315 A    8/1982   Cadote et al. ............... 705/10

(List continued on next page.)

FOREIGN PATENT DOCUMENTS

| EP | 0 809 387 A2 | | 5/1997 |
|---|---|---|---|
| WO | WO 97/16911 | | 5/1997 |
| WO | 97/23988 | * | 7/1997 |
| WO | WO 98/19472 | | 5/1998 |
| WO | WO 99/01826 | | 1/1999 |

OTHER PUBLICATIONS

Biggs, M., "Help for the Web enhances customer support, reduces helpdesk load" *Inforworld*, Jun. 16, 1997, v. 19, No. 24, pp. 82+.

(List continued on next page.)

*Primary Examiner*—Patrice Winder

(57) ABSTRACT

A web/Internet-based Outbound Network Management tool that enables customers of telecommunications network providers to modify outbound access to their virtual networks via a Web/Internet-based graphical user interface. Via a secure Web/Internet-based connection, the tool enables customers to add, create, modify or view their outbound network telecommunications network assets including: calling party numbers, calling cards, virtual network dialing plans, and their Code ID/Set attributes and features associated with their virtual networks.

17 Claims, 24 Drawing Sheets

U.S. PATENT DOCUMENTS

| | | |
|---|---|---|
| 4,817,050 A | 3/1989 | Komatsu et al. ............... 707/10 |
| 4,893,248 A | 1/1990 | Pitts et al. .................... 705/400 |
| 4,972,504 A | 11/1990 | Daniel, Jr. et al. ............ 705/10 |
| 5,041,972 A | 8/1991 | Frost ............................ 705/10 |
| 5,075,771 A | 12/1991 | Hashimoto ................... 725/46 |
| 5,131,020 A | 7/1992 | Liebesny et al. ............ 455/422 |
| 5,228,076 A | 7/1993 | Hopner et al. ........... 379/93.17 |
| 5,245,533 A | 9/1993 | Marshall ....................... 705/10 |
| 5,285,494 A | 2/1994 | Sprecher et al. ............. 455/423 |
| 5,287,270 A | 2/1994 | Hardy et al. ................... 705/34 |
| 5,315,093 A | 5/1994 | Stewart ....................... 235/381 |
| 5,325,290 A | 6/1994 | Cauffman et al. ............ 705/34 |
| 5,327,486 A | 7/1994 | Wolff et al. ............... 379/93.23 |
| 5,369,571 A | 11/1994 | Metts ............................ 705/10 |
| 5,452,446 A | 9/1995 | Johnson ......................... 707/1 |
| 5,475,836 A | 12/1995 | Harris et al. .................... 707/1 |
| 5,481,542 A | 1/1996 | Logston et al. .............. 725/131 |
| 5,483,596 A | 1/1996 | Rosenow et al. ............ 713/167 |
| 5,490,060 A | 2/1996 | Malec et al. ................... 705/10 |
| 5,491,779 A | 2/1996 | Bezjian ........................ 345/440 |
| 5,526,257 A | 6/1996 | Lerner ........................... 705/10 |
| 5,530,744 A | 6/1996 | Charalambous et al. ...................... 379/266.08 |
| 5,537,611 A | 7/1996 | Rajaopal et al. ........ 379/221.07 |
| 5,548,726 A | 8/1996 | Pettus ......................... 709/221 |
| 5,551,025 A | 8/1996 | O'Reilly et al. .......... 707/104.1 |
| 5,563,805 A | 10/1996 | Arbuckle et al. ............ 709/204 |
| 5,566,351 A | 10/1996 | Crittenden et al. ............ 710/46 |
| 5,602,918 A | 2/1997 | Chen et al. .................. 713/153 |
| 5,610,915 A | 3/1997 | Elliott et al. ................. 370/259 |
| 5,621,727 A | 4/1997 | Vandreuil ................... 370/401 |
| 5,623,601 A | 4/1997 | Vu ............................... 713/201 |
| 5,630,066 A | 5/1997 | Gosling ....................... 709/221 |
| 5,649,182 A | 7/1997 | Reitz .............................. 707/7 |
| 5,650,994 A | 7/1997 | Daley .......................... 370/259 |
| 5,666,481 A | 9/1997 | Lewis ............................ 714/4 |
| 5,671,354 A | 9/1997 | Ito et al. ..................... 713/201 |
| 5,689,645 A | 11/1997 | Schletter et al. ............ 709/226 |
| 5,692,030 A | 11/1997 | Teglovic et al. ............... 379/14 |
| 5,692,181 A | 11/1997 | Annand et al. ............. 707/102 |
| 5,696,906 A | 12/1997 | Peters et al. ................... 705/34 |
| 5,699,403 A | 12/1997 | Ronnen ................... 379/15.04 |
| 5,699,528 A | 12/1997 | Hogan ......................... 705/40 |
| 5,706,502 A | 1/1998 | Foley et al. .................. 707/10 |
| 5,708,780 A | 1/1998 | Levergood et al. ......... 709/229 |
| 5,721,908 A | 2/1998 | Largarde et al. .............. 707/10 |
| 5,721,913 A | 2/1998 | Ackroff et al. ............. 707/103 |
| 5,727,129 A | 3/1998 | Barrett et al. ................. 706/10 |
| 5,734,709 A | 3/1998 | De Witt et al. ......... 379/221.15 |
| 5,734,831 A | 3/1998 | Sanders ....................... 709/223 |
| 5,742,762 A | 4/1998 | Scholl et al. ............... 709/200 |
| 5,742,763 A * | 4/1998 | Jones .......................... 709/317 |
| 5,742,768 A | 4/1998 | Gennaro et al. ............ 709/203 |
| 5,742,905 A | 4/1998 | Pepe et al. ................... 455/461 |
| 5,745,754 A | 4/1998 | Lagarde et al. .......... 707/104.1 |
| 5,754,830 A | 5/1998 | Butts et al. .................. 709/311 |
| 5,764,756 A | 6/1998 | Onwelller .................... 379/242 |
| 5,768,501 A | 6/1998 | Lewis .......................... 714/48 |
| 5,774,660 A | 6/1998 | Brendel et al. ............. 709/201 |
| 5,778,178 A | 7/1998 | Arunachalam .............. 709/203 |
| 5,778,377 A | 7/1998 | Marlin et al. ............... 707/103 |
| 5,781,550 A | 7/1998 | Templin et al. ............. 370/401 |
| 5,781,632 A | 7/1998 | Odom ........................... 705/78 |
| 5,787,160 A | 7/1998 | Chaney et al. ......... 379/112.06 |
| 5,787,412 A | 7/1998 | Bosch et al. ................... 707/2 |
| 5,790,780 A | 8/1998 | Brichta et al. ................ 714/46 |
| 5,790,789 A | 8/1998 | Suarez ....................... 709/202 |
| 5,790,797 A | 8/1998 | Shimada et al. ............ 709/224 |
| 5,793,762 A | 8/1998 | Penners et al. ............. 370/389 |
| 5,793,964 A | 8/1998 | Rogers et al. .............. 709/202 |
| 5,796,393 A | 8/1998 | MacNaughton et al. .... 345/733 |
| 5,799,154 A | 8/1998 | Kuriyan ...................... 709/223 |
| 5,802,320 A | 9/1998 | Baehr et al. ................. 709/249 |
| 5,805,803 A | 9/1998 | Birrell et al. ................ 713/201 |
| 5,812,533 A | 9/1998 | Cox et al. .................... 870/259 |
| 5,812,654 A | 9/1998 | Anderson et al. ....... 379/221.15 |
| 5,812,750 A | 9/1998 | Dev et al. ....................... 714/4 |
| 5,815,080 A | 9/1998 | Taguchi ...................... 340/635 |
| 5,815,665 A | 9/1998 | Teper et al. ................. 709/229 |
| 5,819,225 A | 10/1998 | Eastwood et al. ........... 704/275 |
| 5,819,271 A | 10/1998 | Mahoney et al. .............. 707/9 |
| 5,825,769 A | 10/1998 | O'Reilly et al. ............ 370/360 |
| 5,826,029 A | 10/1998 | Gore, Jr et al. ............. 707/227 |
| 5,826,269 A | 10/1998 | Hussey ........................ 707/10 |
| 5,835,084 A | 11/1998 | Bailey et al. ................ 345/783 |
| 5,844,896 A | 12/1998 | Marks et al. ................ 370/385 |
| 5,845,067 A | 12/1998 | Porter et al. ................. 713/200 |
| 5,845,267 A | 12/1998 | Romen ........................ 705/40 |
| 5,848,233 A | 12/1998 | Radia et al. ................. 713/201 |
| 5,848,396 A | 12/1998 | Gerace ......................... 705/10 |
| 5,848,399 A | 12/1998 | Burke ........................... 705/27 |
| 5,850,517 A | 12/1998 | Verkeler et al. ............. 709/202 |
| 5,852,810 A | 12/1998 | Sotiroff et al. ................ 705/27 |
| 5,852,812 A | 12/1998 | Reeder ........................ 705/39 |
| 5,862,325 A | 1/1999 | Reed et al. .................. 709/201 |
| 5,870,558 A | 2/1999 | Branton, Jr. et al. ........ 709/224 |
| 5,877,759 A | 3/1999 | Bauer .......................... 709/317 |
| 5,881,237 A | 3/1999 | Schwaller et al. ........... 709/224 |
| 5,884,032 A | 3/1999 | Bateman et al. ............ 709/204 |
| 5,892,900 A * | 4/1999 | Ginter et al. ................ 713/200 |
| 5,907,681 A | 5/1999 | Bates et al. .................. 709/228 |
| 5,909,679 A | 6/1999 | Hall ............................... 707/4 |
| 5,909,682 A | 6/1999 | Cowan et al. .................. 707/9 |
| 5,915,001 A | 6/1999 | Uppaluru .................. 379/88.22 |
| 5,920,542 A | 7/1999 | Henderson .................. 370/217 |
| 5,923,016 A | 7/1999 | Fredregill et al. ............ 235/380 |
| 5,930,764 A | 7/1999 | Melchione et al. ............ 705/10 |
| 5,930,804 A | 7/1999 | Yu et al. .................. 707/104.1 |
| 5,933,142 A | 8/1999 | LaStrange et al. ........... 345/788 |
| 5,937,165 A | 8/1999 | Schwaller et al. ........... 709/224 |
| 5,938,729 A | 8/1999 | Cote et al. ................... 709/224 |
| 5,949,976 A | 9/1999 | Chappelle ................... 709/224 |
| 5,958,016 A * | 9/1999 | Chang et al. ................ 709/229 |
| 5,960,411 A | 9/1999 | Hartman et al. .............. 705/26 |
| 5,961,602 A | 10/1999 | Thompson et al. ........... 705/40 |
| 5,963,925 A | 10/1999 | Kolling et al. ................ 705/40 |
| 5,966,695 A | 10/1999 | Melchione et al. ............ 705/10 |
| 5,970,467 A | 10/1999 | Alavi .......................... 705/10 |
| 5,974,396 A | 10/1999 | Anderson et al. ............. 705/10 |
| 5,974,441 A | 10/1999 | Rogers et al. .............. 510/433 |
| 5,982,891 A | 11/1999 | Ginter et al. ................. 705/54 |
| 5,991,733 A | 11/1999 | Aleia et al. ..................... 705/8 |
| 5,991,806 A | 11/1999 | McHann, Jr. ............... 709/224 |
| 5,999,972 A | 12/1999 | Gish ............................ 709/219 |
| 5,999,973 A | 12/1999 | Glitho et al. ................ 709/223 |
| 6,003,079 A | 12/1999 | Friedrich et al. ............ 709/224 |
| 6,006,265 A | 12/1999 | Rangan et al. .............. 709/226 |
| 6,011,844 A | 1/2000 | Uppaluru et al. ....... 379/220.01 |
| 6,012,090 A | 1/2000 | Chung et al. ............... 709/219 |
| 6,014,447 A * | 1/2000 | Nizzari et al. ................ 705/39 |
| 6,014,702 A | 1/2000 | King et al. .................. 709/227 |
| 6,018,768 A | 1/2000 | Ullman et al. .............. 709/218 |
| 6,013,904 A * | 2/2000 | An et al. ..................... 379/201 |
| 6,021,409 A | 2/2000 | Burrows ..................... 707/102 |
| 6,023,762 A | 2/2000 | Dean et al. .................. 713/193 |
| 6,029,182 A | 2/2000 | Nehab et al. ................ 707/523 |
| 6,032,132 A | 2/2000 | Nelson ......................... 705/34 |
| 6,032,184 A * | 2/2000 | Cogger et al. .............. 709/223 |
| 6,041,325 A | 3/2000 | Shah et al. .................... 705/34 |
| 6,044,144 A | 3/2000 | Becker et al. ......... 379/265.02 |
| 6,044,362 A | 3/2000 | Neely .......................... 705/34 |

| | | | |
|---|---|---|---|
| 6,049,602 A | | 4/2000 | Foladare et al. ....... 379/265.04 |
| 6,049,789 A | | 4/2000 | Smorodinsky ............... 705/59 |
| 6,058,381 A | | 5/2000 | Nelson ......................... 705/40 |
| 6,064,667 A | | 5/2000 | Gisby et al. ................ 370/352 |
| 6,065,002 A | | 5/2000 | Knotts et al. .................. 707/4 |
| 6,065,059 A | | 5/2000 | Shieh et al. ................ 709/233 |
| 6,073,105 A | | 6/2000 | Sutcliffe et al. ............... 705/1 |
| 6,073,122 A | | 6/2000 | Wool .......................... 705/51 |
| 6,073,241 A | | 6/2000 | Rosenberg et al. ......... 713/201 |
| 6,078,891 A | | 6/2000 | Riordan et al. ............... 705/10 |
| 6,078,924 A | | 6/2000 | Ainsbury et al. ........... 707/101 |
| 6,085,171 A | | 7/2000 | Leonard ...................... 705/26 |
| 6,085,190 A | | 7/2000 | Sakata .......................... 707/6 |
| 6,091,808 A | * | 7/2000 | Wood et al. ........... 379/201.04 |
| 6,094,655 A | * | 7/2000 | Rogers et al. ................ 707/10 |
| 6,115,040 A | * | 9/2000 | Bladow et al. ............. 345/791 |
| 6,115,458 A | * | 9/2000 | Taskett .................... 379/114.2 |
| 6,115,737 A | * | 9/2000 | Ely et al. .................... 709/203 |
| 6,115,963 A | * | 9/2000 | McDonough et al. ......... 705/10 |
| 6,119,109 A | * | 9/2000 | Muratani et al. ........... 705/400 |
| 6,128,624 A | | 10/2000 | Papierniak et al. ...... 707/104.1 |
| 6,131,095 A | * | 10/2000 | Low et al. .................... 704/10 |
| 6,134,584 A | * | 10/2000 | Chang et al. ............... 709/219 |
| 6,137,869 A | | 10/2000 | Voit et al. .............. 379/114.01 |
| 6,145,001 A | * | 11/2000 | Scholl et al. ............... 709/223 |
| 5,982,864 A | | 12/2000 | Jagadish et al. ............ 379/120 |
| 6,161,128 A | * | 12/2000 | Smyk ......................... 709/205 |
| 6,212,506 B1 | * | 4/2001 | Shah et al. .................. 705/418 |
| 6,212,558 B1 | * | 4/2001 | Arthur et al. ............... 709/221 |
| 6,253,239 B1 | | 6/2001 | Shklar et al. ............... 709/217 |

OTHER PUBLICATIONS

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suie Makes a PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direcet Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/.html.

Vizard, M. et al., "MCI to Pilot Convergence Billing Service", *InfoWorld*, v. 28, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility.", Product Announcement, *Edge*, Oct. 2, 1995, on & about AT&T, v. 10, n. 375, p. 11(1).

"New software platform enhances network management capabilities . . . ", *Business Wire*, Sep. 28, 1995 p. 9281122.

"User's Guide: Microsoft Access", Microsoft Corporation, 1994, pp. 378,594–599, 630–632 (13).

Jainschigg, J., "Billing confirmed: this easy–to–use box turns guest calls into revenue." *Teleconnect*, vol. 12, No. 9, p. 39(4).

Markovich, Robert, "WAN Service Level Management Could Keep Your Feet Out of the Fire, Ensure Carriers Dilligence", Network World, July 7, 1997.

He, Taniguchi, "Internet Traffic Control and Management Architecture", IEEE, Oct. 22–24, 1998, pp. s46–03–1—s46–03–5.

Sixth Interantional Conference on Network Protocols, IEEE, Technical Communication Services, Oct. 13–16, 1998, Table of Contents.

D. Brent Chapman and Elizabeth D. Zwicky, Building Internet Firewalls, Nov. 1995, O'Reilly & Associates, p. 58.*

Meteorology; Databases, "Infornics offers controlled access to Web Meteorology", Information Today, Apr. 97, vol. 14 Issue 4, p. 53, 2p. This article reports that Infronics has developed a controlled access gateway to MGA (Meteorological and Geoastrophysica).

Rosen,Michele,"BPCS steps into new millennium", Midrange Systems; Spring House; May 10, 1996. This article informs about the new release of BPCS Client/Server Software as the most extensive upgrade of the product since 1980s. It incorporates onject tech (abstract).

Inoue et al., "Secure Mobile IP Using Security Primitives", IEEE 1997.

* cited by examiner

FIG. 9(e)

INTEGRATED PROXY INTERFACE FOR WEB BASED TELECOMMUNICATIONS NETWORK MANAGEMENT

CROSS-REFERENCE TO RELATED APPLICATIONS

The following patent application claims the benefit of U.S. Provisional Patent Application Serial No. 60/060,655 filed Sep. 26, 1997.

FIELD OF THE INVENTION

The present invention relates generally to information delivery systems and, particularly, to a novel, WWW/Internet-based, telecommunications network management service for customers of a telecommunications service provider.

BACKGROUND OF THE INVENTION

Telecommunications service entities, e.g., MCI, AT&T, Sprint, and the like, presently provide for the presentation and dissemination of customer account and network data management information to their customers predominantly by enabling customers (clients) to directly dial-up, e.g., via a modem, to the entity's application servers to access their account information, or, alternately, via dedicated communication lines, e.g., ISDN, T-1, etc., enabling account information requests to be initiated through their computer workstation running, for example, a Windows-based graphical user interface. The requests are processed by the entity's application server's, which retrieves the requested customer information from one or more databases, processes and formats the information for downloading to the client's personal computer, or more primitively, a 3270 dumb terminal or a low-end workstation.

Telecommunications service providers that offer 800/8xx (toll-free) and other "virtual" telecommunications network services, e.g., private networks, to their customers currently provide some type of user interaction to manage their virtual and private networks and call routing plans.

The assignee of the present invention, MCI, currently provides an MCI ServiceView ("MSV") product line referred to as Virtual Network "Vnet" which is a telecommunications service offering private network capabilities and features at low cost to multi-location companies with domestic and international calling needs. Particularly, the Vnet virtual network uses switched public network facilities, sophisticated software systems, and MCI's virtual network to provide customers with a private voice and data network. MCI's Vnet service additionally provides consolidated long distance service for all locations, eliminating the need to provide multiple long distance services to locations of different sizes. Thus, Vnet is suitable for long distance calls between company locations, as well as long distance calls to U.S. and international locations. This allows for a consolidation of all company long distance usage charges for all locations under one corporate invoice and one basic rate structure subject to a volume discount.

Another MCI MSV product is referred to as "Vision" which is an integrated product for consolidated or multi-location business. The "Vision" network platform is similar to that of "Vnet," and is also a software defined virtual network telecommunications service offering a single solution for: domestic and international outbound calling, inbound Toll-Free service, card, data and the different access types which include: outbound, Toll-free inbound, switched data, dedicated and IntraLATA. Vision also offers Customized Business Programs with special rates and discounts geared to meet customer's specific traffic pattern needs.

Further provided by MCI is an MSV Outbound Network Management system ("Outbound NM") which enables customers to manage the Vnet/Vision Features selected for their networks including: 1) Call Tracking and Control Features: 2) Call Routing Features: and 3) Multiple Networks Feature. Particularly, the MSV Outbound NM system is a PC-Windows based GUI to MCI's Network Control System ("NCS") which comprises interrelated software and hardware components allowing customer's to enter and process MCI Outbound NM orders. With more particularity, NCS comprises the following components: 1) a legacy order entry system referred to as MCI's Network Capabilities System ("NetCap") which system provides near "real-time" processing (editing, validation, logging) of customer orders pertaining to customers' Vnet and Vision networks entered therein; 2) data access points ("DAPS") which implements Vnet and Vision call routing plan orders at the network switches; and, 3) a Service Control Manager ("SCM") which provides the link between NetCap and the DAPs for translating, formatting and distributing the information included in the submitted orders to each of the DAPS. Once an order is implemented on the DAPS, Vnet and Vision network calls are processed with the features specified in the order.

Particularly, NetCap is a mainframe MVS system that implements an on-line subsystem for accepting orders for toll-free, VNET, and Vision routing plans. It also has a background-processing subsystem that takes these orders, processes them, stores them in a database, and feeds orders to SCM. Currently, the three methods employed for accessing NetCap are: a direct 3270 terminal connection for internal MCI users which provides access to 100 percent of NetCap's functions; a PC-based 3270 terminal emulation program that utilizes 56 kbps dial-up access to a majority of NetCap functions; and, the PC-based Windows application entitled "OutBound NM," written in C++, for example, which enables customers to implement and configure routing plans for Vnet network via the existing MCI Service View (MSV) infrastructure comprising a private network of routers and protocol converters that connect PC Windows applications to NetCap.

With more particularity, the MSV Outbound NM Call Tracking and Control feature enables a customer to establish the rules that apply to calls made on their Vnet/Vision network including: 1) establishment of Range Privileges for allowing restriction of calls to specific geographic areas; 2) establishment of Range Restrictions for restricting the use of a calling card from a specific origination point to specified termination point(s); 3) establishment of rules for extending a customer's Vnet/Vision network beyond a corporate boundary; 4) establishment of Supplemental Codes which may be used for controlling and monitoring a business including ID codes that specify who may place calls and their range privileges, and accounting codes that associate a call with a category that a customer may specify for their internal audit/call management purposes; and 5) establishment of exclusions which enable the blocking of calls to specific numbers and/or geographic locations, e.g., prohibiting calls to a single number or range of specified public numbers.

The MSV Outbound NM Call Routing feature enables the customer to engineer the routes that calls follow on their network. Thus, customers may: 1) define a dialing plan order enabling the creation of private numbers and vanity numbers; 2) force public numbers on the network; 3) implement Customized Message Announcements ("CMA") which enables a call to be routed to a pre-recorded message including, for example, customer-defined messages and error-intercept messages; 4) implement exclusions; 5) implement hotlines which enables automatic dialing of a specified number, e.g., upon lifting of the handset; and, 6) point of origin routing which enables the designation of an alternative DAL, overriding the DAL already specified in the dialing plan based on originating switch. Further, customers are enabled to reroute a call originating from a Dedicated Access Line ("DAL") to a different destination (DAL), Calling Party Number ("CPN") or customized message announcement) when the called number is busy. A dedicated access line is a direct link from a company tp the nearest service provider switch.

The MSV Outbound NM Multiple Networks feature enables a Vnet to be structured in a way that a company's individual subsidiaries or divisions may have their own sub-network of the company's "main" Vnet network and enables the individual subsidiaries or divisions to define their own Vnet requirements.

Using the MSV MCI Outbound NM involves creating and approving orders that change the configuration of a customer's network. MCI Outbound NM assigns each order a unique number (e.g., in the format VXXXXXX) and presents a series of screens for user input and approval. Once the order is approved and becomes complete in the system, it becomes a record in the customer's inventory, and the change is active within the customer's network. An inventory is a complete listing of the current configuration of a customer's Vnet/Vision Network, including Calling Party Numbers (CPNs), Calling Cards, Dedicated Access Lines (DALs), Remote Access Number(s) and all active records (complete orders) in the network database.

Subject to predefined security access privileges, the functionality for processing an order using MSV Outbound NM includes: creating a new order or open an existing order; specifying a Date/Time that the host system is to complete the order; specifying an Order Priority for processing by the host; adding/changing/deleting information on the order as required; and, approving the order.

Specifically, there are two types of access levels to MCI MSV Outbound NM: 1) System Administrator; and, 2) User. For example, a special User ID may be established for each System Administrator of the customer's corporation which would enable the system administrator to perform the following: 1) view a list of users or workstations; 2) add a user; 3) add an MCI ServiceView application to a user; 4) Modify user information; 5) reset a user's password; 6) delete a user and/or application. The System Administrator may further assign or restrict certain MCI Outbound NM features for each user which can range from the types of orders a user can access, to various levels of order administration privileges, such as approving or unapproving an order. For example, MCI Outbound NM user privileges that may be established include: permitting or restricting a user's access to 1) calling party number (CPN) orders; 2) Calling Card Orders; 3) dialing plan orders; and 4) ID code set orders. Further privileges may include: 5) authority to approve orders. For example, if user's access is restricted, the user may create orders, but they will remain in a "Not Approved" status when the orders are closed. A user with order approval authority must open the orders and approve them to release them for processing; 6) authority to specify an order priority, e.g., immediate approval would correspond to order priority 1; 7) authority to modify orders. For example, if permitted, the user can modify/delete orders that are in "Not Approved" status; 8) authority to unapprove orders. For example, if permitted, the user can unapprove an "approved" order that has not yet completed, in order to modify or delete the order; and, 9) ability to modify the date/time required for an approved order. Further order administrative functions enabled by MSV Outbound NM include: ability too review orders without changing them; and, the ability to see the status of an order.

While the current Outbound Network Management features in the current MSV platform are sufficient for those with existing access, a need exists to provide a newer, faster platform with new Outbound network management capabilities for customers through the public Internet.

Moreover, a need exists to integrate the existing MSV Outbound network management client-server application in a Web-based platform which provides expedient comprehensive and more secure data access and reporting services to customers from any Web browser on any computer workstation anywhere in the world.

SUMMARY OF THE INVENTION

The present invention is directed to a novel Outbound network management tool for a Web-based (Internet and Intranet) client-server application that enables customers to define their own Virtual Network (Vnet) routing plans via the Web/Internet. The Outbound network management tool enables customers to order and link network attributes and features to their outbound network calling party numbers, calling cards, and Vnet/Vision dialing plans, and to assign ID Code/Set(s) to outbound network subscribers.

The Outbound network management tool client server application is a Web-based, object-oriented application that implements a Remote Method Invocation "RMI"-like protocol providing customers with the ability to request, specify, receive and view data pertaining to their Vnet network management assets, e.g., Vnet number routing plans, calling card inventories, etc., and to generate orders for changing aspects of the Vnet routing plans via a World Wide Web interface.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;
2) a network architecture defining the physical network needed to satisfy the security and data volume requirements of the networkMCI System;
3) a data architecture detailing the application, back-end or legacy data sources available for netoworkMCI Interact; and
4) an infrastructure covering security, order entry, fulfillment, billing, self-monitoring, metrics and support.

Each of these common component areas will be generally discussed hereinbelow. A detailed description of each of these components can be found in a related, co-pending U.S. patent application Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
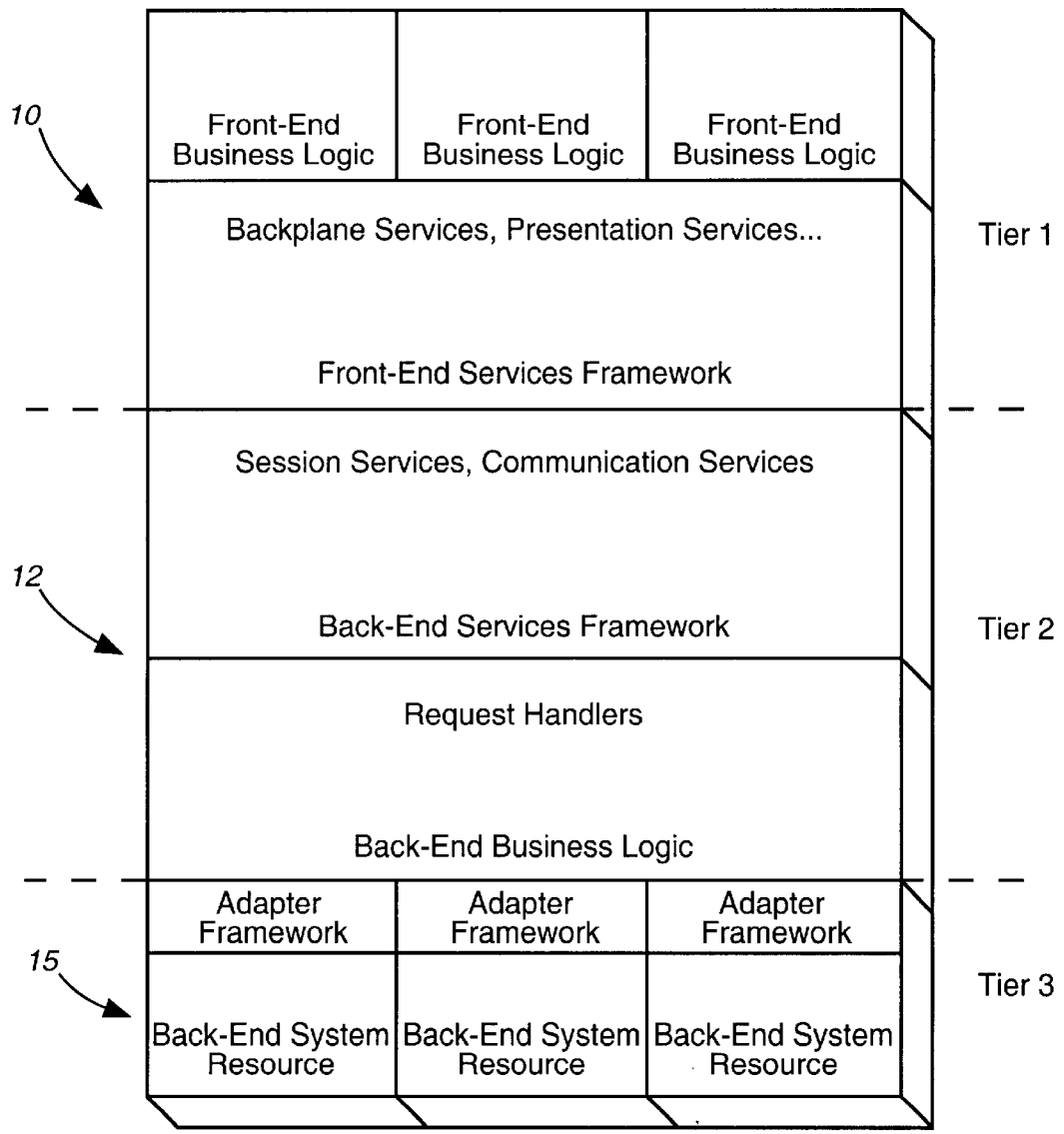
FIG. 1 illustrates the software architecture component comprising a three-tiered structure.

FIG. 1 is a diagrammatic illustration of the software architecture component in which the present invention functions. A first or client tier 10 of software services are resident on a customer work station 10 and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite.

A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in co-pending U.S. patent application Ser. No. 09/159,515, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programed to provide a reusable and common GUI abstraction and problem-domain abstractions. More specifically, the client-tier software is created and distributed as a set of Java classes including the applet classes to provide an industrial strength, object-oriented enviroment over the Internet. Application-specific classes are designed to support the functionality and server interface for each application with functionality delivered through the system being of two-types: 1) cross-product, for example, inbox and and reporting functions, and 2) product specific, for example, toll free network management of Call manager functions. The system is capable of delivering to customers the functionality appropriate to their product mix.

Figure 2:
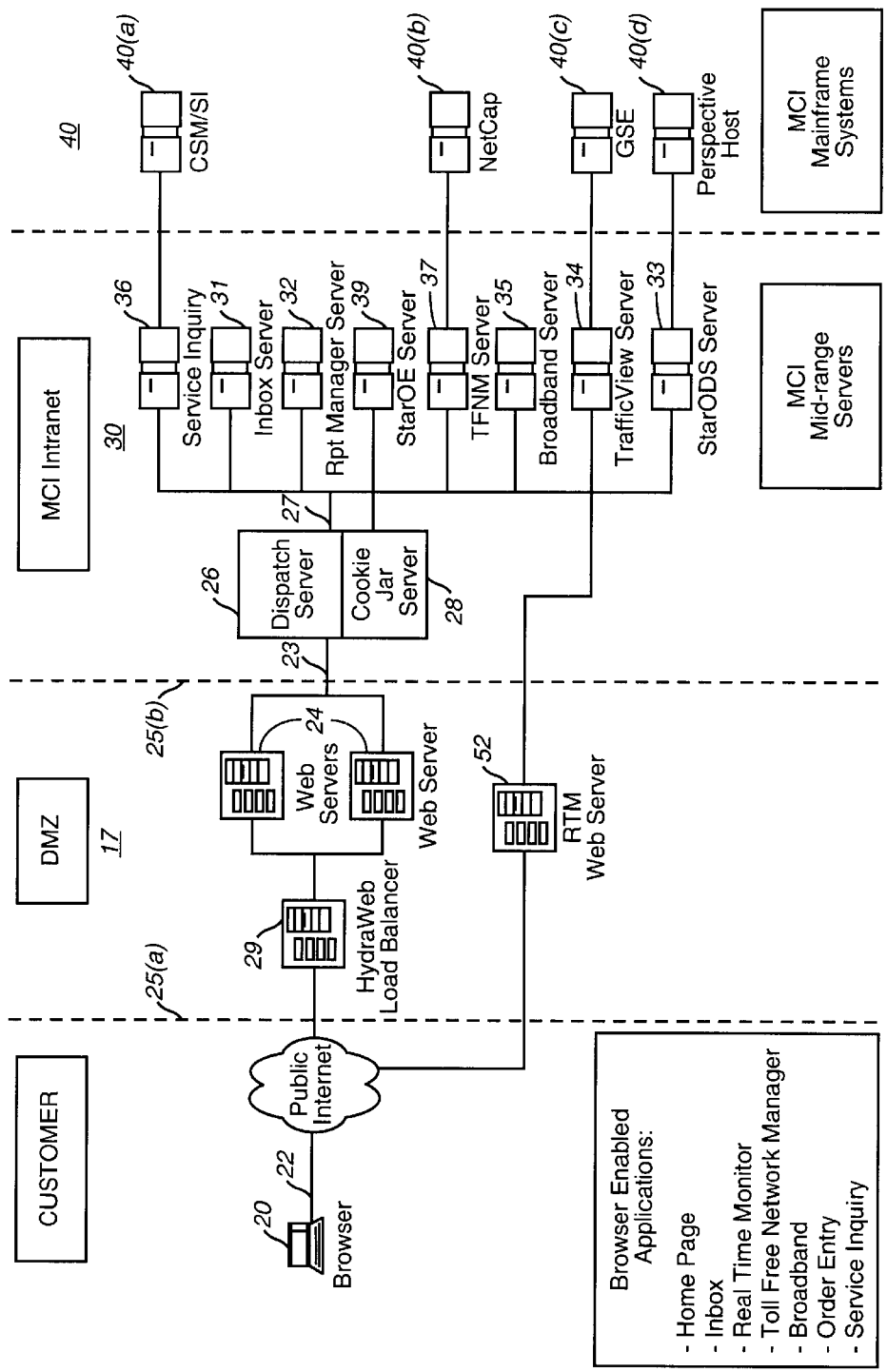
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
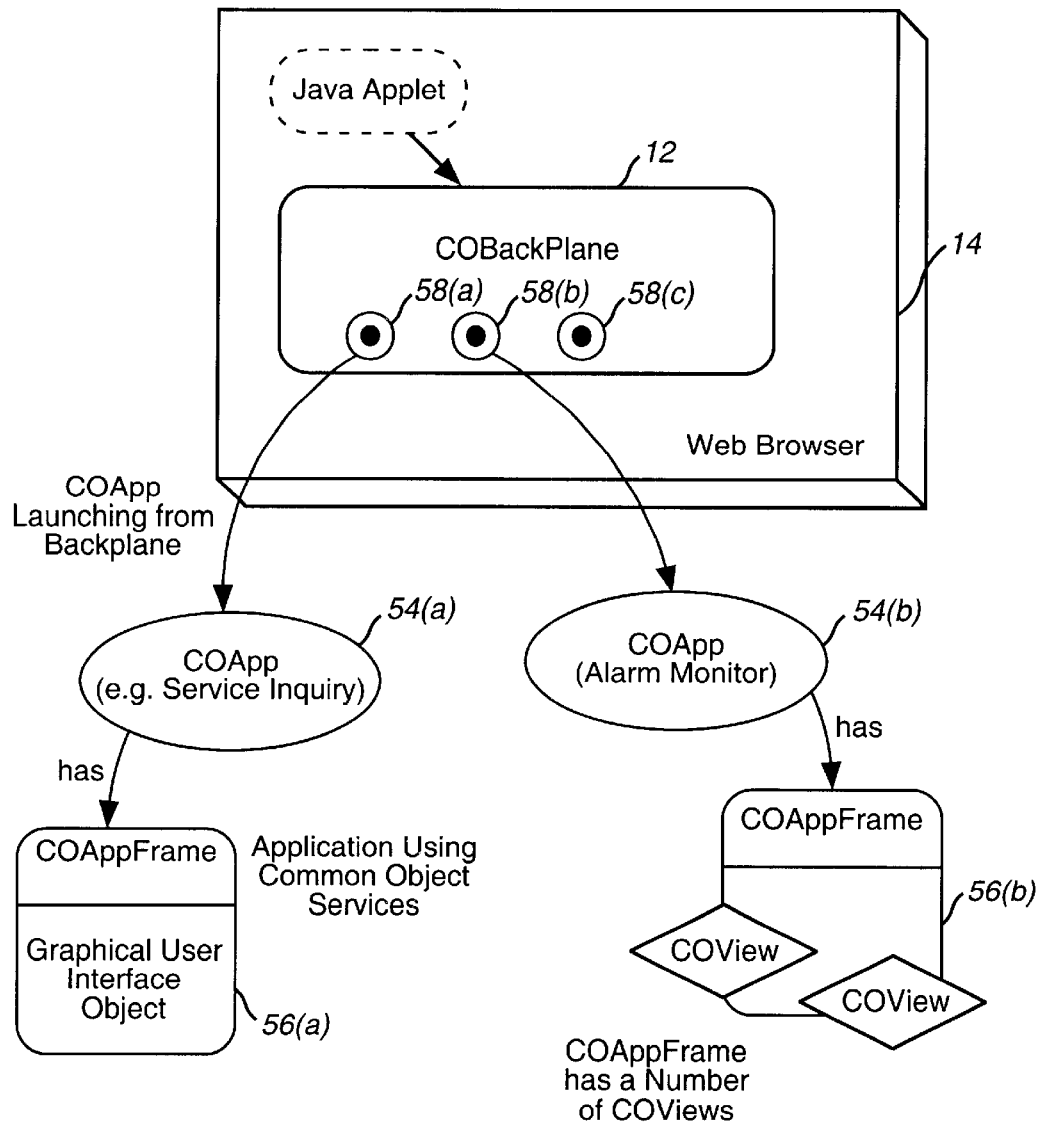
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515 entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
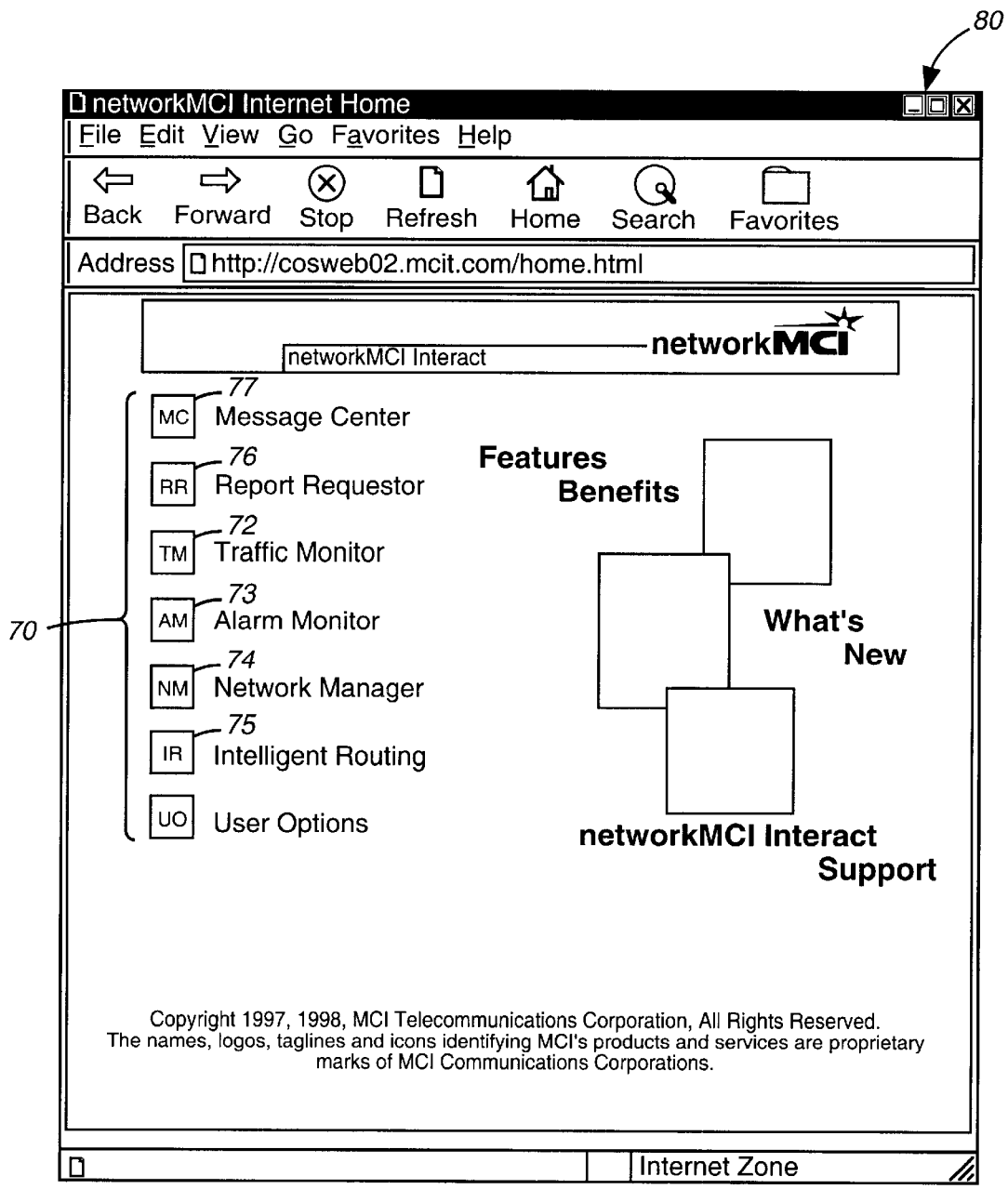
FIG. 4 illustrates an example client GUI presented to the client/customer as a browser web page.

FIG. 4 illustrates an example client GUI presented to the client/customer as a browser web page 80 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, CoBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods inito, start(), stop() and run(). In the init() method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp() method. The launched application then may use the backplane for inter-application communications, including retrieving Inbox data.

The COBackPlane 12 includes methods for providing a reference to a particular COApp, for interoperation. For example, the COBackPlane class provides a getApp() method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application, U.S. patent application Ser. No. 09/159,515 entitled, GRAPHICAL USER INTERFACE FORWEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second secure socket connection 23 to the dispatch server 26 inside the enterprise Intranet.

As described in greater detail in co-pending U.S. patent application Ser. No. 09/159,514 entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS. The preferred embodiment uses SSL which provides a cipher spec message which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPs request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. A new cookie will be generated when the response to the HTTPS request is sent to the client. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 49 at logon time and cached.

If the requester is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(*a*). Such network management and customer network data is additionally accessible by authorized MCI management personnel. As shown in FIG. 2, other legacy platforms 40(*b*), 40(*c*) and 40(*d*) may also communicate individually with the Intranet servers for servicing specific transactions initiated at the client browser. The illustrated legacy platforms 40(*a*)–(*d*) are illustrative only and it is understood other legacy platforms may be integrated into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
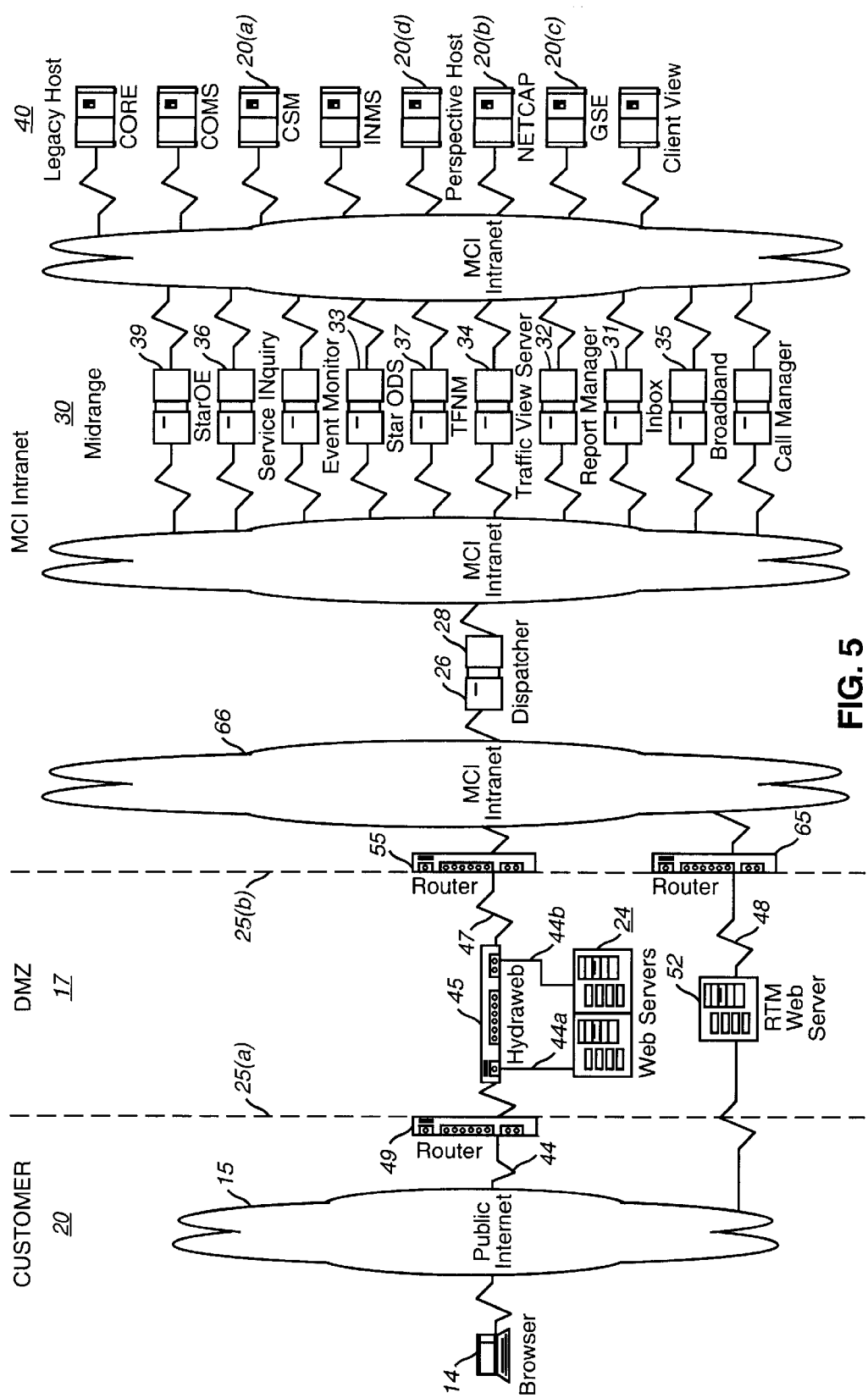
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25*a*, 25*b*. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 29*a* in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the Hydraweb unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516 entitled INTEGRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWeb 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. (D# 11038), the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet StarOE server will manage the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of midrange servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Client View.

The present invention focuses on the client, middle-tier and proxy service that enable customers to request, specify, and receive and view data pertaining to their Vnet network management assets, e.g., Vnet number routing plans, calling card inventories, etc., and to generate orders for changing aspects of the Vnet routing plans via a World Wide Web interface.

Figure 6:
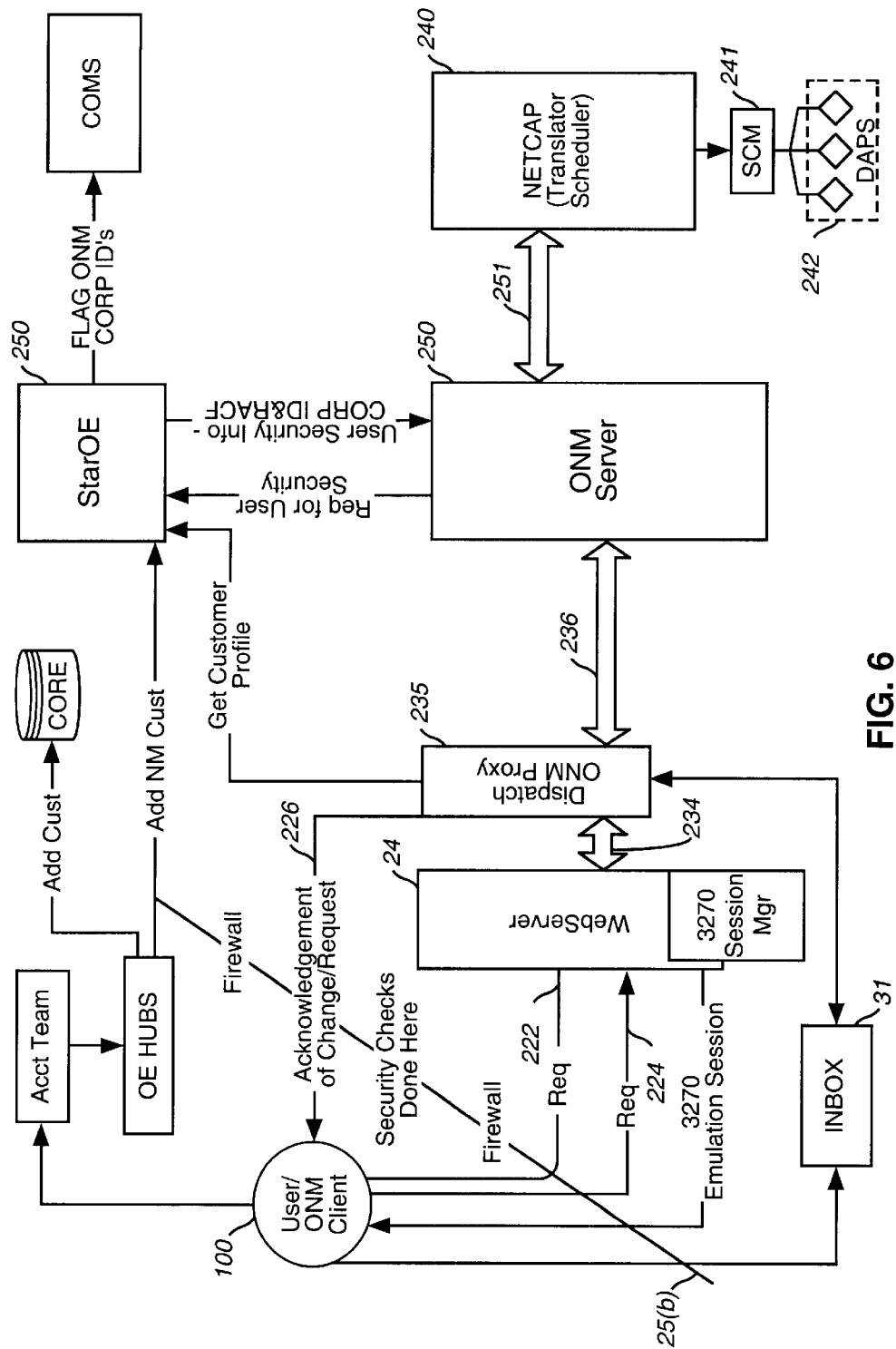
FIG. 6 is a block diagram depicting the physical architecture of the ONM system 200 of the invention.

As shown in FIG. 6, the Outbound Network Management "ONM" tool 200 of the invention implements an ONM domain server 250 which is one component part of a back-end MCI intranet and legacy system infrastructure comprising above-described MCI's NetCap order entry system 240, Service Control Manager 241 ("SCM") and Data Access Points 242 ("DAP"). As will be described in greater detail, the ONM tool 200 of the invention enables customers to change their VnetNision network management plans, both in real-time and on a scheduled basis, via nMCI Interact's web-based front-end and middle-tier infrastructure. Particularly, customer directives are entered by the user 100 via an ONM graphic user interface. These directives are preferably communicated as Java applets over secure HTTPS socket connections 222, 224 for input over the firewall 25(b) to at least one secure sever, e.g., a DMZ Web server 24 that provides for authentication, validation, and session management in the manner as described in co-pending U.S. patent application Ser. No. 09/159,514 entitled SECURE CUSTOMER INTERFACE FOR WEB BASED DATA MANAGEMENT, the contents and disclosure of which is incorporated by reference as if fully set forth herein. After validation and authentication, the DMZ Web server 24, in turn, re-encrypts messages and dispatches them to the Dispatcher server over TCP/IP connection 234. The Dispatcher server may implement an ONM proxy process 235 which properly receives ONM order messages from the web server, and translates them into a format suitable for transmission over another TCP.IP connection 236 to the ONM domain server 250 interfaces with the "NetCap" 240 mainframe system that provides user interface to the network control system, i.e., DAP switches 242 (FIG. 6). The ONM domain server 250 may include Java object classes whose methods are invoked by Java applets running on the customer browser. The browser Java applets specifically execute the customer directives by invoking certain methods on the ONM Domain server 250. These Java objects additionally provide the interface functions to the NetCap 240. In the preferred embodiment, the Java objects at the ONM domain server function as the ONM proxy, and are invoked remotely implementing a Java remote method invocation "RMI" -like methodology.

Particularly, as mentioned herein with respect to FIG. 2, within the networkMCI Interact framework for producing Java applications over the Internet, there is provided common objects and an infrastructure allowing secure communications between a client (which resides on a browser) and a server (which resides safely within MCI's firewalls). As described, the security strategy includes: encrypting communication from the client to the web-server via SSL (HTTPS) and implementing HTTPS as the preferred method for allowing communication into the web server from the Internet; providing an additional firewall between the web-server and the dispatcher to allow only specific traffic from the web server to the dispatcher to occur; encrypting traffic between the web server and the dispatcher via DSA encryption; and enabling the dispatcher to validate all packets destined to internal MCI servers to ensure that they are from an authenticated client, and that a particular client has permission to communicate with a specific back-end server. To make this seamless for the client, a set of Common Objects performs this messaging, such as described in co-pending U.S. Ser. No. 09/159,515. In the preferred embodiment, the invention implements a modified RMI which is referred to as "CORMI" (Common Objects RMI) which provides an RMI-like interface between the client and the server using the networkMCI Interact protocol. The CORMI procedures implemented have additional controls built in to provide the necessary session security and maintenance for communication over the firewalls.

Figure 7:
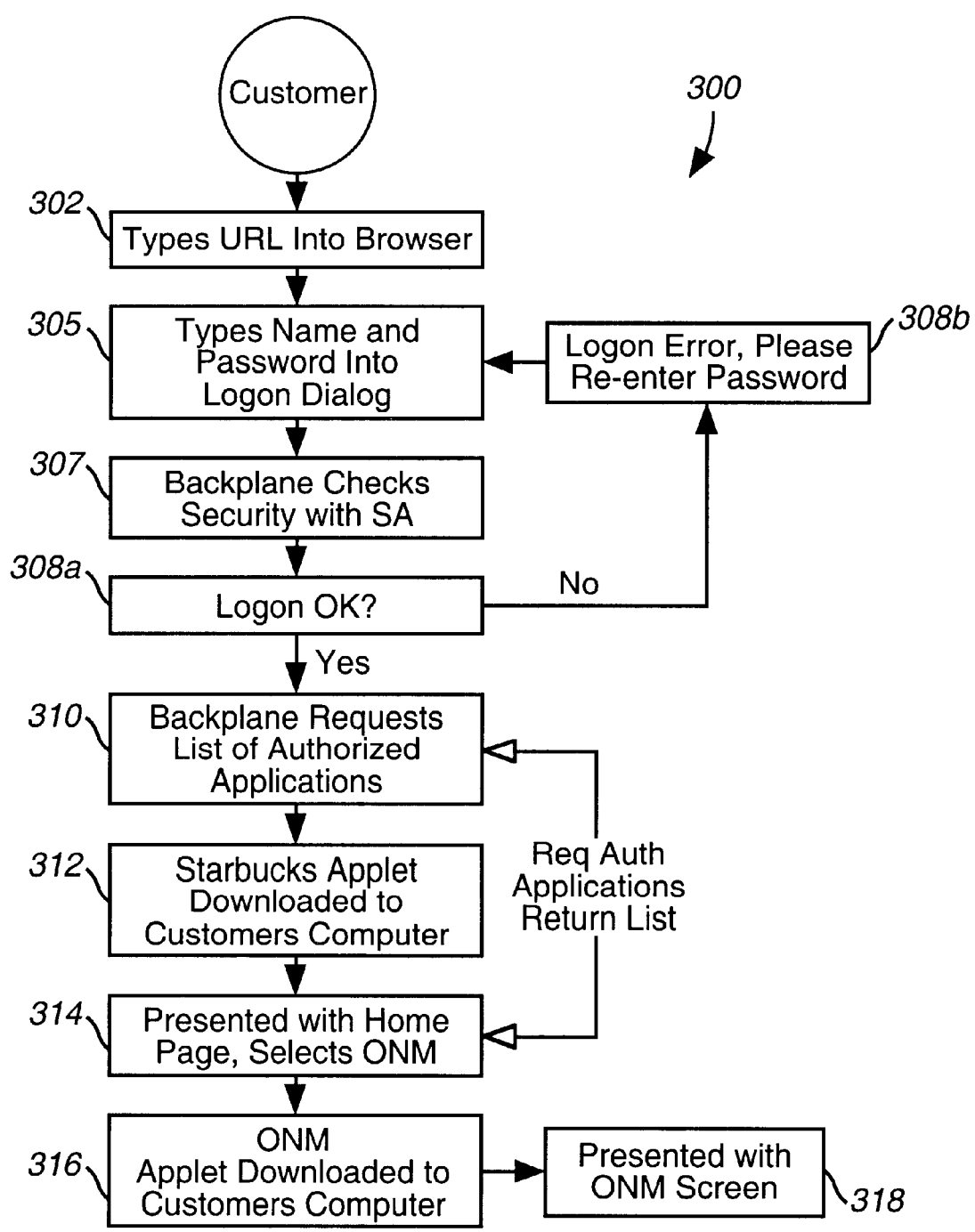
FIG. 7 illustrates a flow diagram depicting the ONM logon/authentication procedure.
Figure 8:
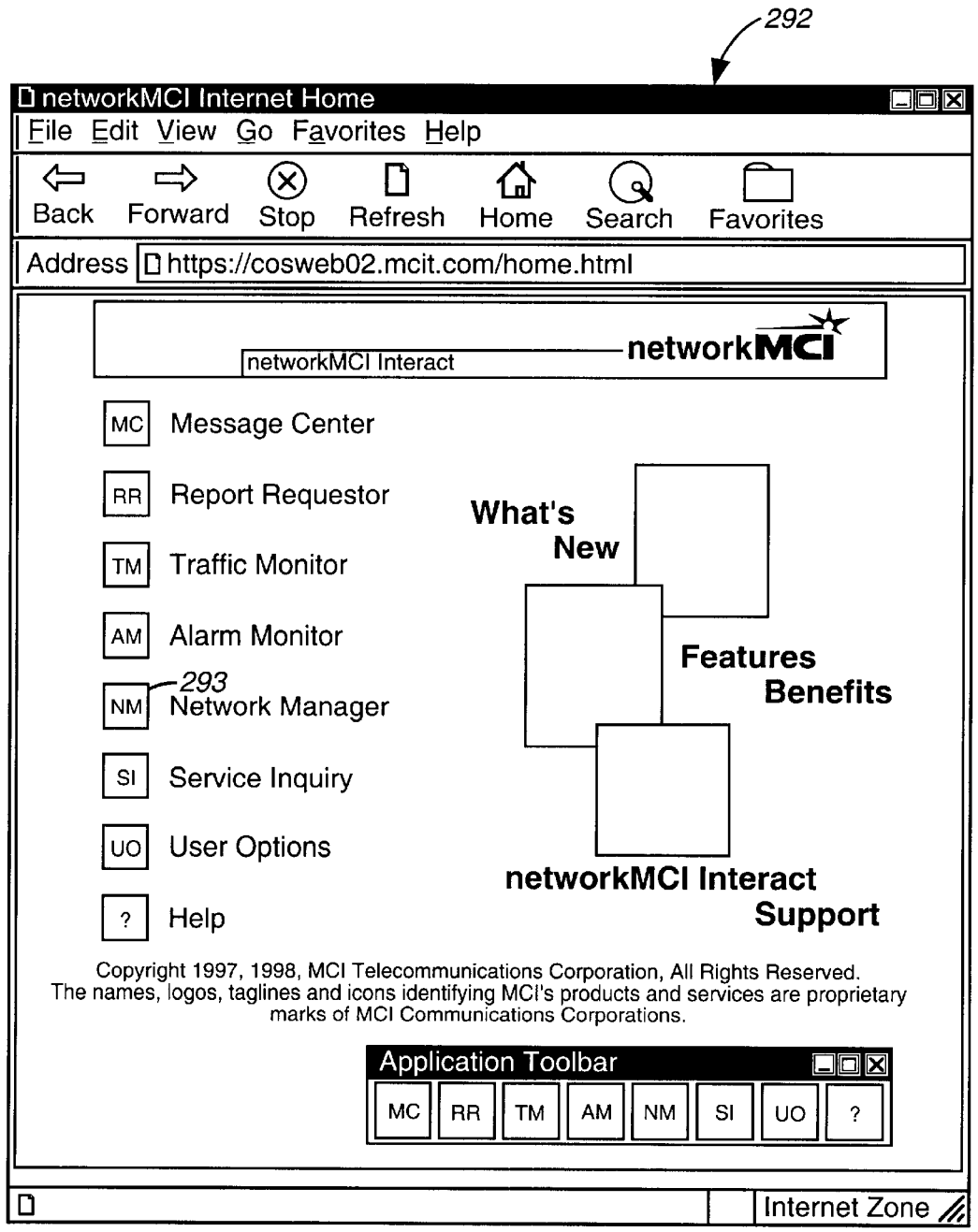
FIG. 8 illustrates an example Web/Internet-based home page screen providing a suite of nMCI Interact applications.

As shown in the process flow diagram of FIG. 7, a customer first types in the URL into the Web Browser where a connection is made to the networkMCI Interact web page, as indicated at step 302. Having accessed the web page, the user logs in, as indicated at step 305, and a user Common Object is created. At this point, a message is sent via an established HTTPS connection via a Dispatcher Server 235 (FIG. 6) to the StarOE Server 260 to validate the customer as indicated at step 307. Once the customer is validated, at step 308a,b, the backplane objects request a list of all the authorized applications from the StarOE server. As indicated at step 310. At steps 312 and 314 respectively, a networkMCI Interact applet is downloaded to the customers Web Browser via the established TCP/IP connection, and the browser presents the customer with the networkMCI Interact systems home page, such as the exemplary home page 292 shown in FIG. 8. It should be understood that in the preferred embodiment, the icons for application the user has security access to are shown bolded. Referring back to FIG. 7, at step 314, the customer selects the ONM application from the home page by clicking on a Network Manager icon 293 (FIG. 8) after StarOE validates the user's id and password in the manner as described in commonly owned, co-pending U.S. patent application Ser. No. 09/159,408 entitled AUTHENTICATION AND ENTITLEMENTS FOR USERS OF WEB BASED DATA MANAGEMENT PROGRAMS, the contents and disclosure of which is incorporated by reference as if fully set forth herein. The backplane object allows the user access to the ONM front end if the user is so authorized. As shown at step 316, a client ONM application is downloaded to the customer who is presented with the ONM screen, as indicated at step 318.

An exemplary ONM web-page display 294 is shown in FIG. 9(*a*) which presents a variety of ONM menu options including: 1) a File menu option 402 providing a selection 404 for creating a new order, a selection 406 for opening an existing order, a selection 408 for displaying events, and a selection 410 for enabling 3270 cut through to a Vnet/Vision configuration management system; 2) an Edit menu 415 providing options for deleting an ONM order or, enabling a search for specific components, e.g., within an Order detail and Inventory windows pertaining to a Calling Party Number ("CPN"), Calling Card, Dialing Plan, and ID Code/Set, such as will be described; 3) a Control menu 420 providing a refresh option to enable a user to retrieve a list of all updated lists that have been altered on the host system including: Network IDs, Range Privileges, ID Code Set, Billing location ID, Customer Service ID, Location/Access type and Provisioning Carrier; and 4) a Report menu 422 providing options enabling a customer to inquire on his/her inventory of CPNS, Calling Cards, Dialing Plans and ID Code Sets.

With more particularity regarding the File menu option 402, when a user selects the new order menu option 404, he/she is presented with a drop down menu (not shown) presenting a section of the order types which can be created via their Web Browser, e.g., CPN, Calling Card, Dialing Plan, and ID Code Set. When the user selects the open order selection 406 from the drop down menu of FIG. 9(*a*), the user is presented with a web page 425 displaying a request order window where the user may enter search criteria from which a user may select orders, or, choose all orders. As shown in FIG. 9(*b*), the user may enter the following search criteria: an exact order number or partial order number in the "order match" field 430; an order type, e.g., Calling Card, CPN, Dialing Plan, ID Code Set, or all, from a drop down list presented by "order type" drop down menu 432; a starting date or current default date in the "starting date" field 435; a user ID or default current user ID from the "user ID" field 439; and, a set of order status check boxes 440 which enables the user to choose an order status, e.g., not approved, approved, complete, and error/rejected.

When multiple orders are retrieved, as a result of an entered search criteria, a web page 442 presenting an "Orders" window will appear such as shown in FIG. 9(*c*). From the Order detail window, an order may be selected, e.g., by double clicking an order summary line 443. The field descriptions for an order displayed in the orders window include: an order number 445 which is a unique number assigned to the order for identification; a currently logged-on user ID 446; the current order status 447; the order type 448, e.g., ID Code, as depicted in FIG. 9(*c*); the date the order was prepared 450, and the effective date/time 451 when the order will be implemented in the network by the host. The details of an order may be retrieved by highlighting the order summary line 443 and pressing the details button 453 or, by double-clicking the order summary line 443. It should be understood that the user may retrieve a web page having an Order window by either selection of a New Order, from FIG. 9(*a*), or, selection from the Open Orders Window, when retrieving existing order(s).

Selection of a new or existing CPN Order option via the nMCI Interact ONM system allows a customer to "link" or attach network features to any Calling Party Number (CPN) that exists in that customer's inventory, i.e., CPNs that are active in that customer's database. Preferably, the following features can be defined/linked to CPNs: 1) Multiple Networks; 2) Supplemental Codes including ID Codes and Accounting Codes; 3) Range Privileges including Universal and Customized; 4) Data vs. Voice Specification; and Extended Enterprise (Location/Access Type).

FIG. 9(*d*) illustrates a web page 455 comprising a CPN order window comprising the following sections: an order administration section 460 for handling administrative aspects of the CPN order; a CPN inventory section 470 used to retrieve CPNs from inventory that are not included on another order. This is accomplished by selection of the retrieve button 475 and enables display of, inter alia, the CPNs and associated PINs, a description assigned to the CPN, and a component count; a CPN updates section 480 which populates the CPN order window by moving selected calling cards from the cards in inventory section or by adding new calling cards to the current order; and, an attributes section 490 for populating an area of the web page screen display 455 with a list of attributes, or features, for a selected CPN in the inventory or updates section.

With more particularity, the CPN order administration section 460 of web page display 455 comprises the following field descriptions: 1) a field 462 enabling a customer to set the date/time when the order is to be implemented by the host. For example, a default time is the current PC date and time, shown in the format of MM/DD/YYYY HH:MM (24 hour clock); 2) a field 464 enabling the establishment of a priority (depending on security access privileges); 3) a field 466 for describing the order's current status. For example, new CPN orders default to "not approved"; 4) a Remarks text field 467 optionally used to describe the contents of the CPN order; and, 5) an Approve field 468 such that when checked, indicates the order is approved and transmitted to the host. After transmission, the field name changes to Approved and the Order Status field displays Approved. It should be understood that, if authorized, a customer may unapprove an approved order that has not completed by reselecting the Approved check box. A pop-up message (not shown) in the web display will prompt the customer to confirm the action.

With more particularity, the CPN inventory section 470 used to retrieve CPNs from CPN order inventory comprises the following field/command button descriptions: a CTRY field 472 including a three-digit country code for the CPN; a CPN Beginning field 474 comprising the remaining digits of the CPN or the beginning number within a range; a Description field 476 comprising an alphanumeric description assigned to the CPN, e.g., the CPN location or company name; a Component Count field 478 indicating how many CPNs are within the CPNs in Inventory section; a Retrieve button 475 such that, when selected, retrieves a list of a customer's available CPNs in inventory that are not included in other orders. Selection of this option will enable a web page display of a Retrieve CPNs from Inventory Window 512 such as shown in FIG. 9(*f*); and, a right arrow ">" command button 479 enabling a customer to move single or multiple (selected) CPNs from the CPNs in inventory section to the CPN Updates to include in the current order.

Figure 9A:
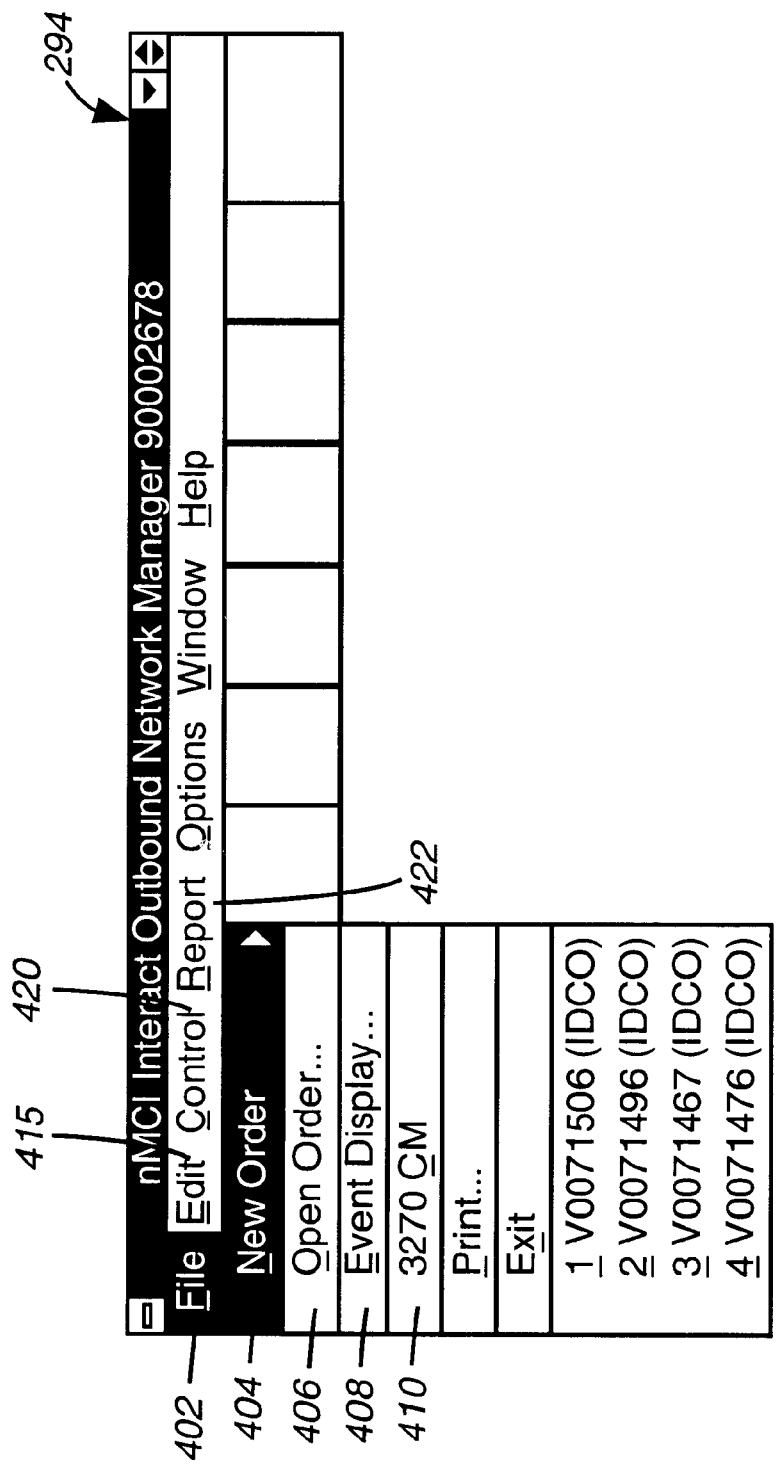
FIGS. 9(a)–9(p) illustrate various examples of ONM web page screen dialogs enabling user interaction with Outbound Network management system.
Figure 9B:
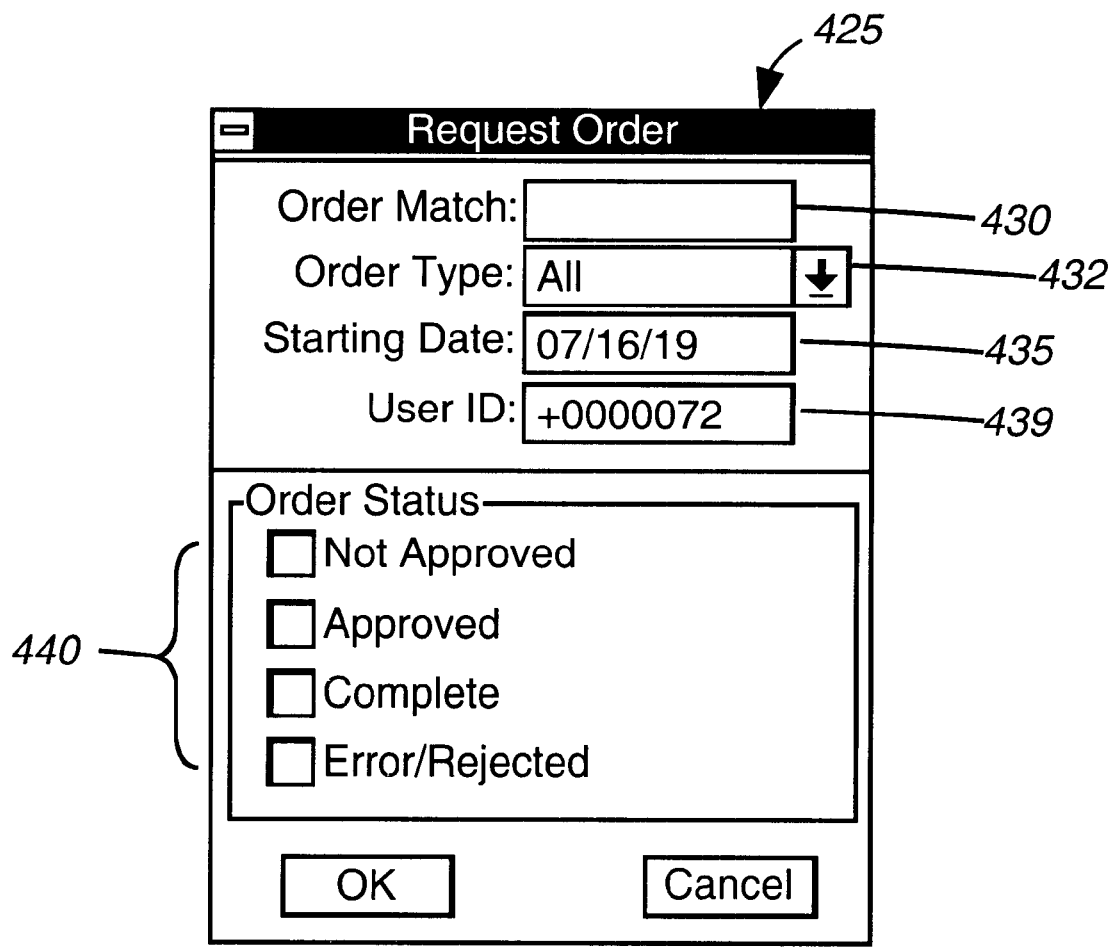
Figure 9C:
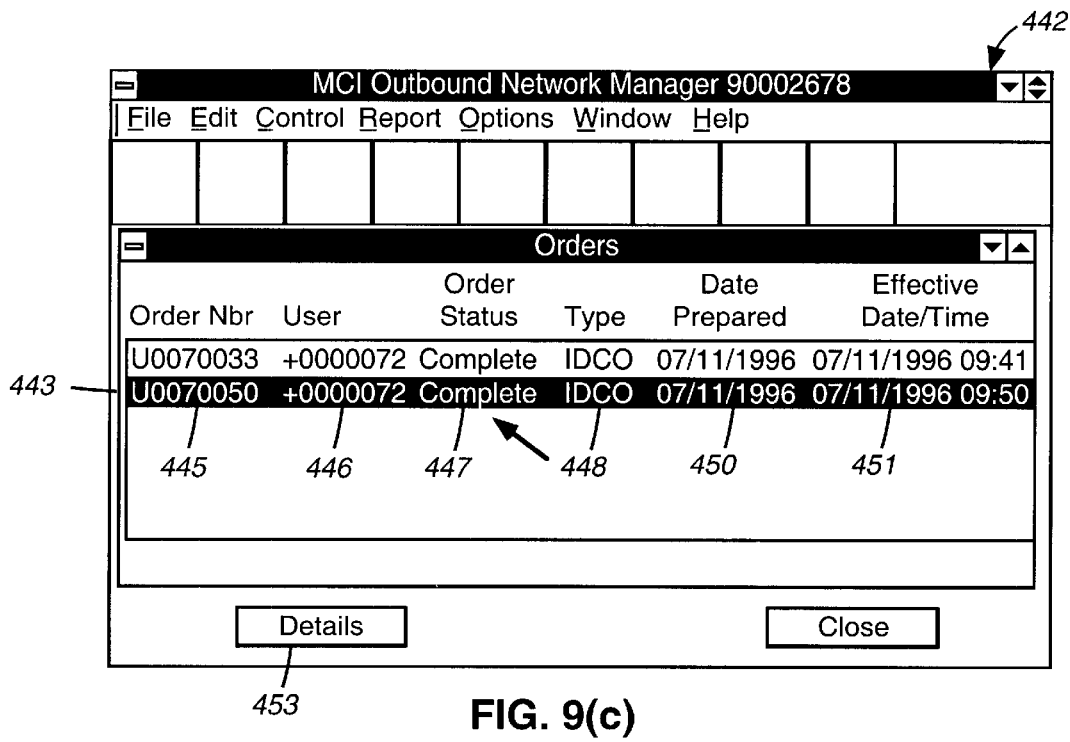

With more particularity, the CPN updates section 480 comprises the following field/command button descriptions: a status code indication field 481 displayed next to a CPN, with the following designations: a (blank) indication meaning no status; an "A" indicating that a new CPN is being added, e.g., Stentor customers; a "C" displayed next to CPNs that have been changed; and a "D" indicating that a CPN has been marked for deletion; a CTRY field 482; a CPN Beginning field 483; a Description field 484; and, a Component Count field 487 as described above; a left arrow "<"

command button 488 enabling a customer to remove a CPN from the current order, and to restore its attributes back to those that were last transmitted to the host, i.e., move one or more highlighted CPNs to the CPNs in Inventory section; an "Add" command button 485, e.g., displayed for Stentor customers, which presents a web page having an Add New CPN window such as shown in FIG. 9(c); and, a "Delete" command button 486, e.g., displayed for Stentor customers marks the highlighted CPN displayed in the CPN Updates section for deletion.

With more particularity, the CPN attributes section 490 comprises the following field/command button descriptions: an "Item" field 492 comprising those Vnet/Vision feature items that are listed in this column once linked to CPN(s), e.g., Range Privilege, ID Code Set, etc.; a "Value" field 493 which comprises the defined value of the network features (e.g., U 001) linked to CPN(s); a "CPN Nbr" field 494 which designates the information displayed in the Attributes section is for the selected CPN, which can be either in the CPNs In Inventory or CPN Updates sections; a "Variable" field 495 which changes according to the item selected in the Attributes section and enables customers to add/change information for the selected item, except when any prepopulated information is dimmed; a <Set Dflt>button 496 which enables a customer to define the PC default for CPN attributes. Once set, the PC default values can be applied to other CPNs by selecting the <Use Dflt>button 497 which command provides the option of applying either the host default or the user-defined PC default attributes for the selected CPN. For example, if the Location Type of the current CPN is "C", default attributes that would change it to "A" or "B" cannot be applied. On the other hand, if Location Type "C" was established as a default with <Set Dflt>, a pop-up message will prompt the user to confirm using it as a default when you select <Use Dflt>; an <Undo>button 498 for removing any changes made to the selected CPN, and restoring its attributes back to those that were last transmitted to the host, an <Expand>button 499 enabling the display of the Calling Party Number Attributes window, such as shown in FIG. 9(g); and a <Close>button 491 for closing the CPN Order window.

Figure 9D:
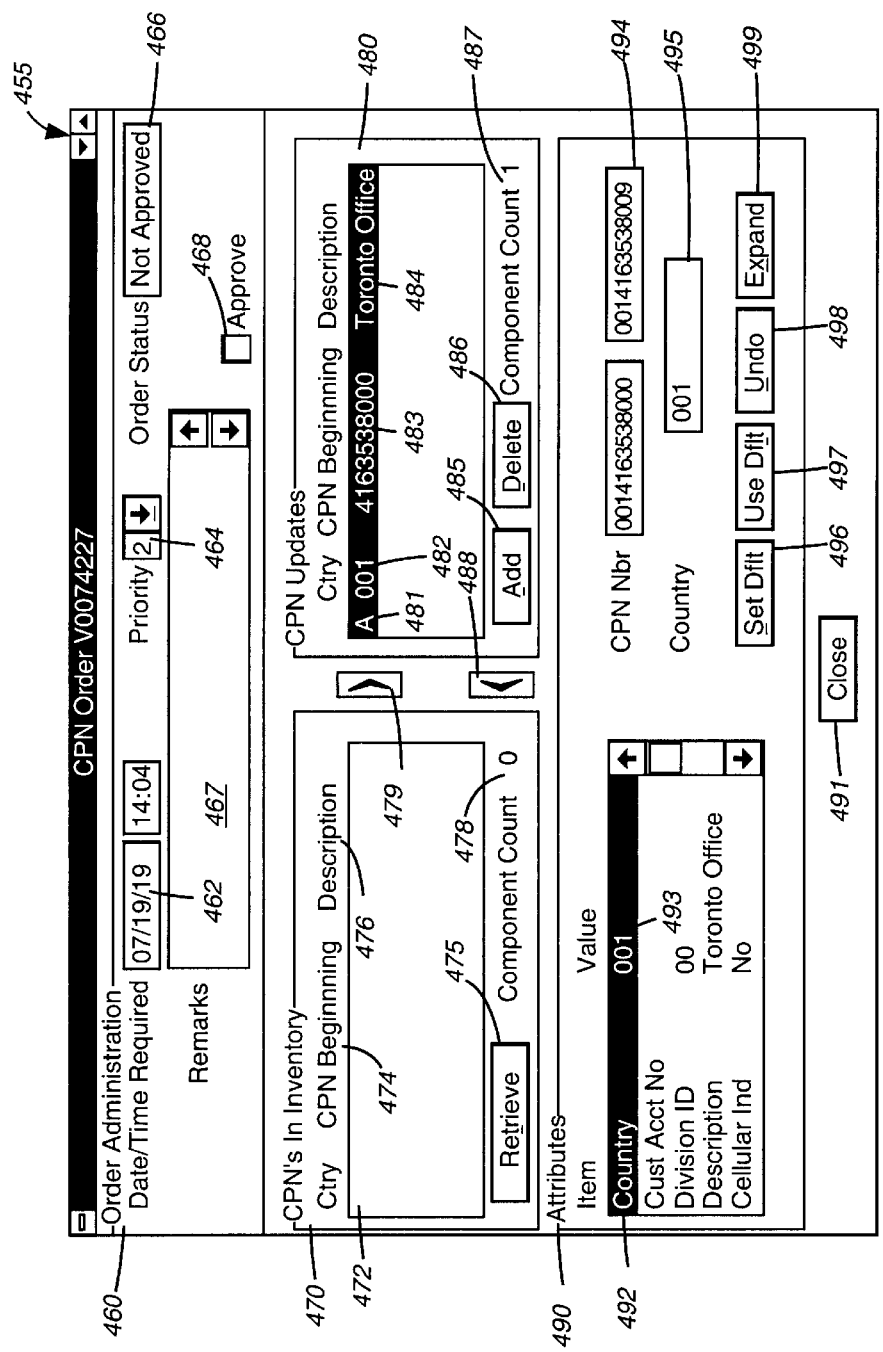
Figure 9E:
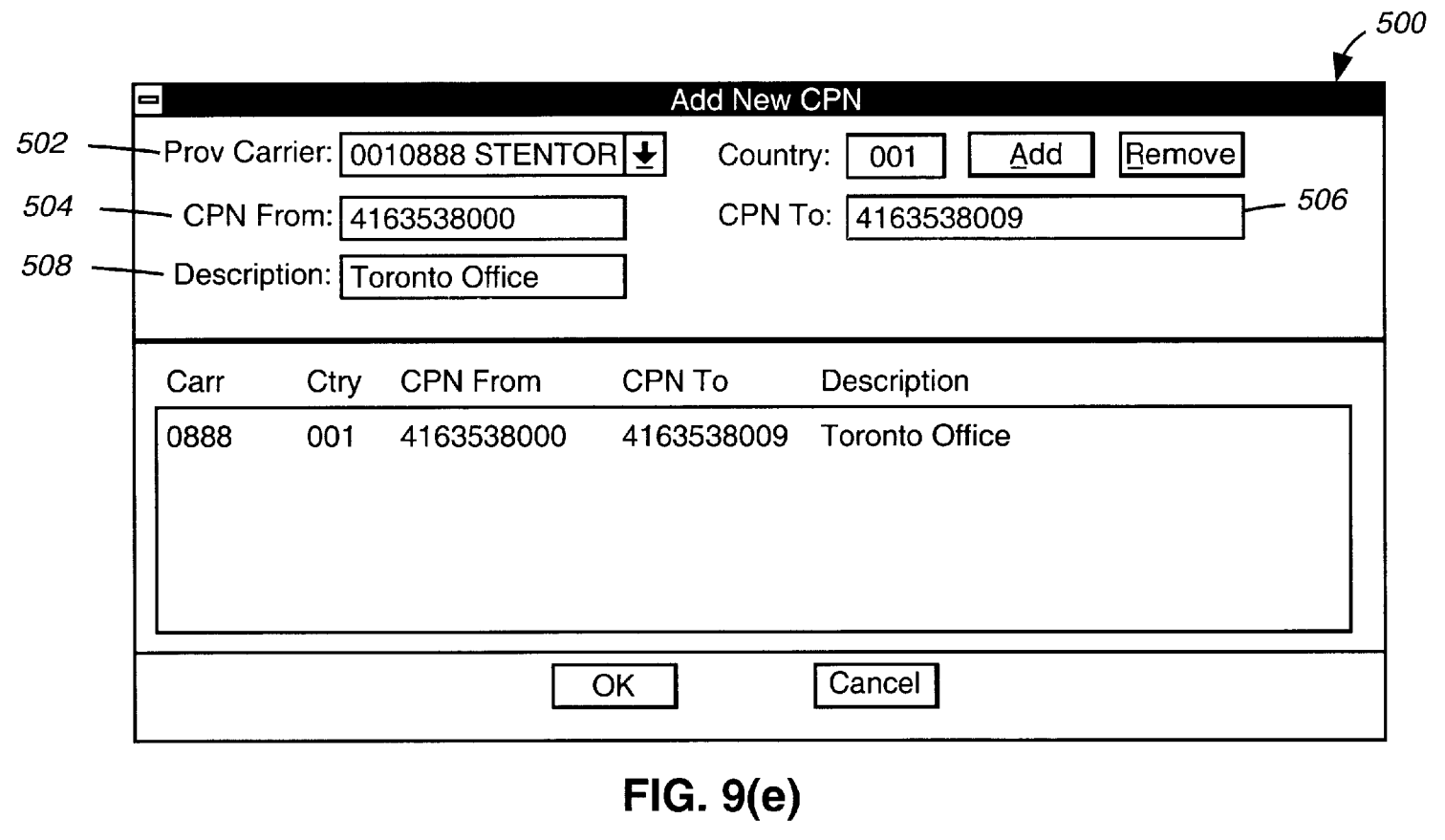

The Add New CPN window 500 such as shown in FIG. 9(e) enables a customer, if authorized, to add a new CPN to their inventory and assign it attributes. In the example web page display shown in FIG. 9(e), the Add new CPN functionality includes: assigning a provisioning carrier in entry field 502; adding a CPN-From number in entry field 504; adding a CPN-To number in entry field 506; and, adding a CPN description in entry field 508. Preferably, the added CPN(s) are displayed in the CPN Updates section 480 with the "A" indication 481 as shown in FIG. 9(d). It should be understood that CPN orders may be deleted by selecting the delete button 486 (FIG. 9(d)).

Figure 9F:
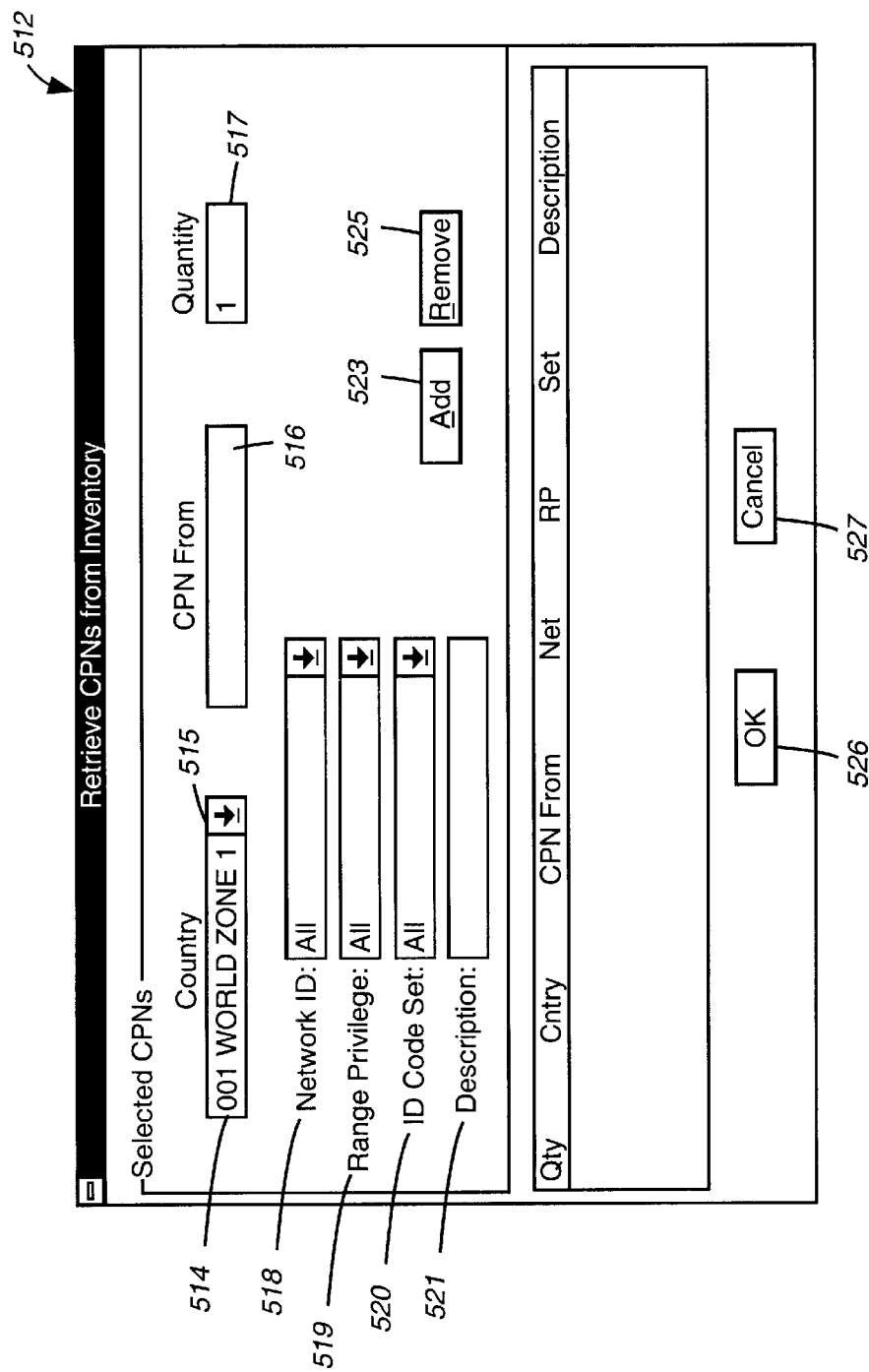

As mentioned above, selection of the CPN Retrieve button 475 enables a web page display of a Retrieve CPNs from Inventory Window 512 such as shown in the example web page display of FIG. 9(f). From this window, a customer may specify search criteria or retrieve a predetermined amount of CPNs having defaulted criteria. Particularly, the Retrieve CPNs from Inventory Window 512 comprises the following field/command button descriptions for retrieving CPNs from customer inventory: a country field 514 for a country code from a drop-down list by selecting a "down" arrow 515 when specifying a CPN in the CPN From field; a CPN From field 516 enabling a customer to enter a partial or whole CPN, e.g., from 3–25 numeric characters. The nMCI Interact ONM system matches the partial CPN and retrieves the first 10 exchanges available in inventory; a Quantity field 517 enabling a customer to enter a value, from 1 to 200 per CPN group, specifying the quantity of CPNs to include in the retrieval; a Network ID field 518 enabling a customer to select a specific Network ID from the drop-down list by selecting the down arrow; a Range Privilege field 519 enabling a customer to select a specific Range Privilege from the drop-down list by selecting the down arrow; an ID Code Set field 520 enabling a customer to select a specific ID Code Set number from the drop-down list by selecting the down arrow. It should be understood that ID Code Sets must be defined prior to creating the CPN Order, as will be described herein; a Description field 521 enabling a customer to type a full or partial CPN description as retrieval criteria; an <Add>button 523 for updating the list box with the group information from the Country, CPN From, Quantity, Network ID, Range Privilege, ID Code Set and Description edit boxes; a <Remove>button 525 enabling a customer to remove a highlighted display item so that it is not included in the retrieval request; an <OK>button 526 for accepting all entries in the Retrieve CPNs from Inventory window, and messaging the host. If nMCI Interact ONM finds one or more CPNS that matches specified search criteria, it will close the Retrieve CPNs from Inventory window. If the Retrieve CPNs from Inventory window is accessed from the CPN Order window, the results are displayed in the CPNs in Inventory section and replaces any CPNs that may have been in this section prior to retrieval; and, a <Cancel>button 527 for closing the Retrieve CPNs from Inventory window without accepting any changes.

Figure 9G:
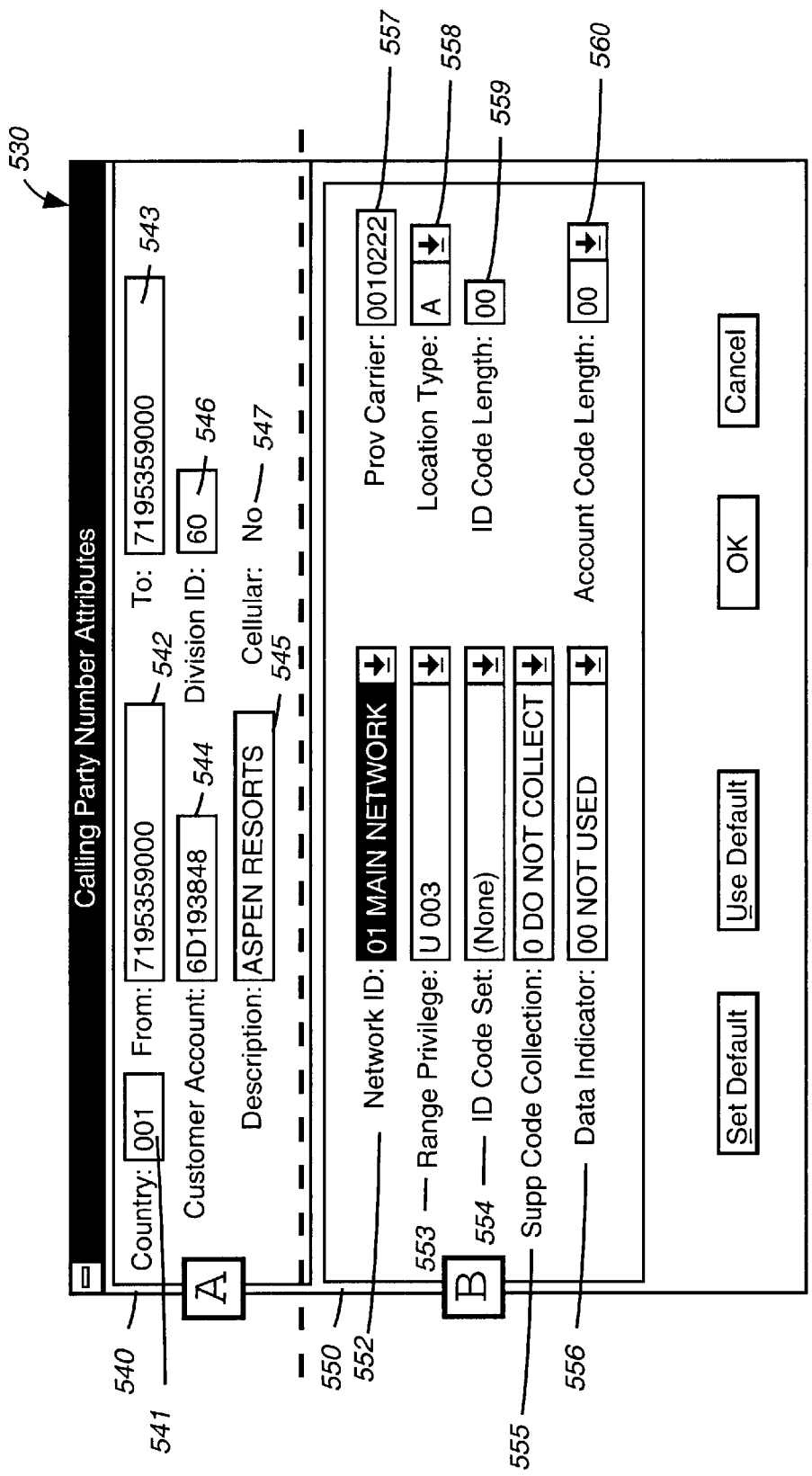
Figure 9H:
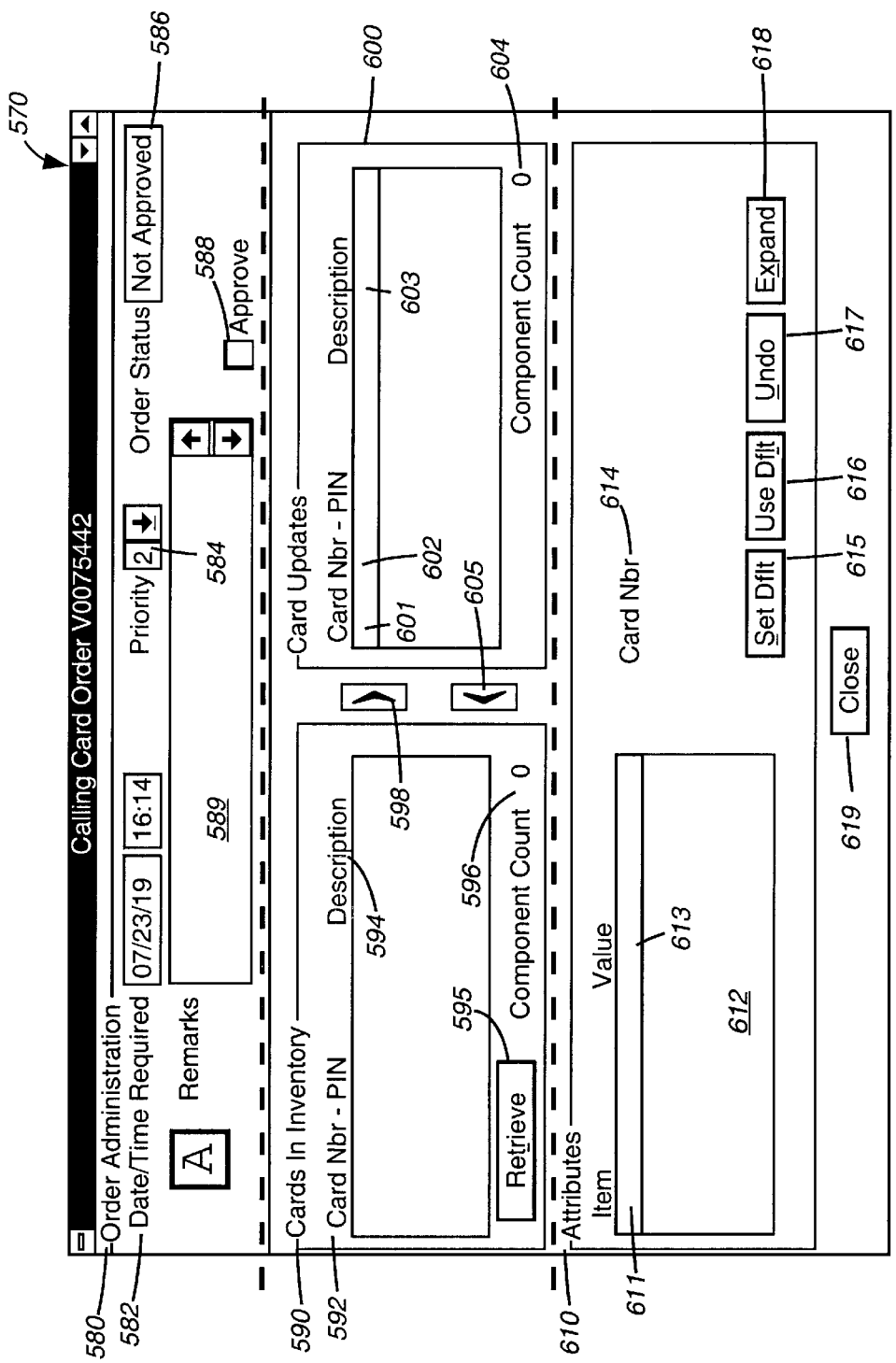
Figure 9I:
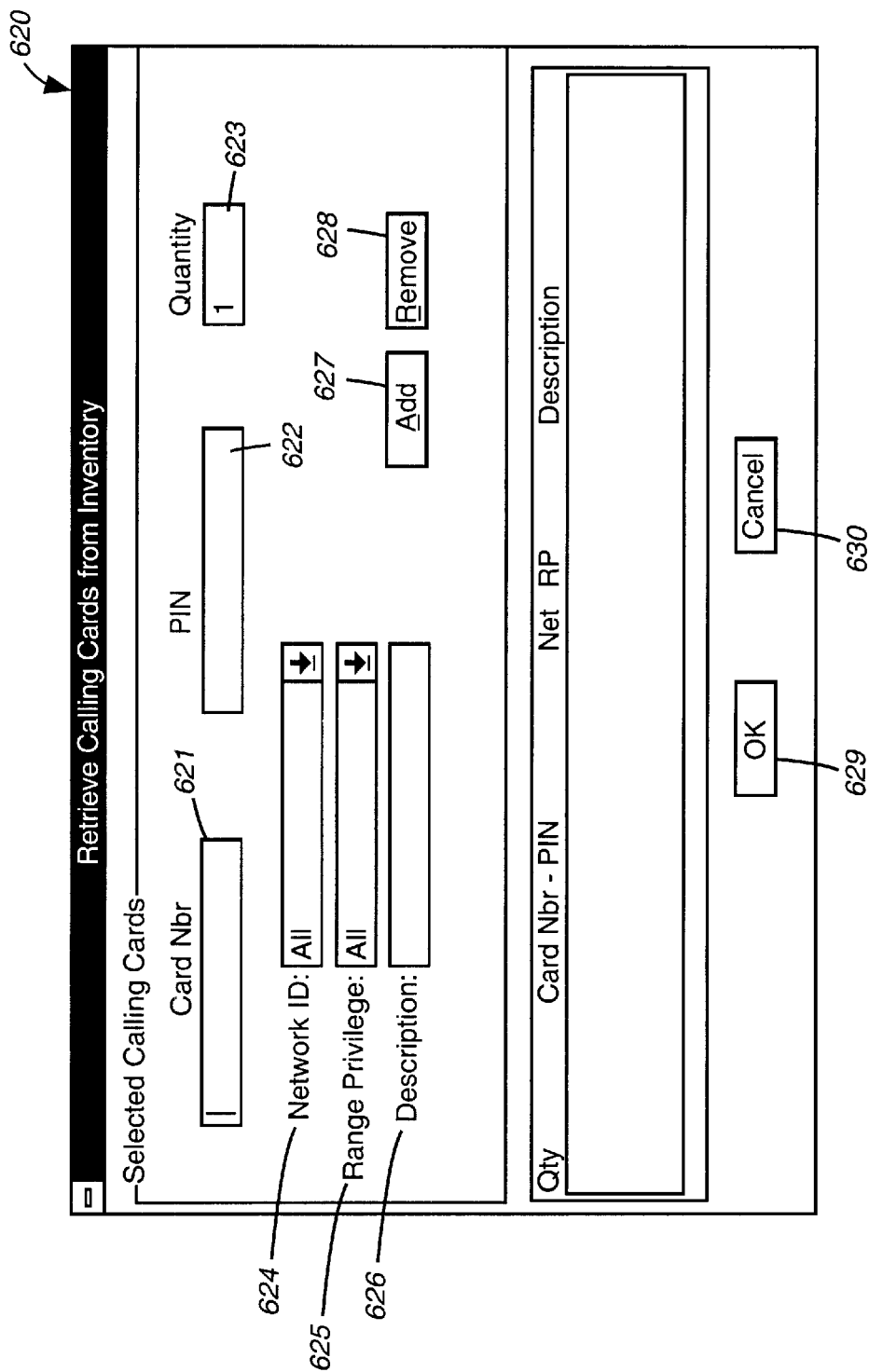
Figure 9J:
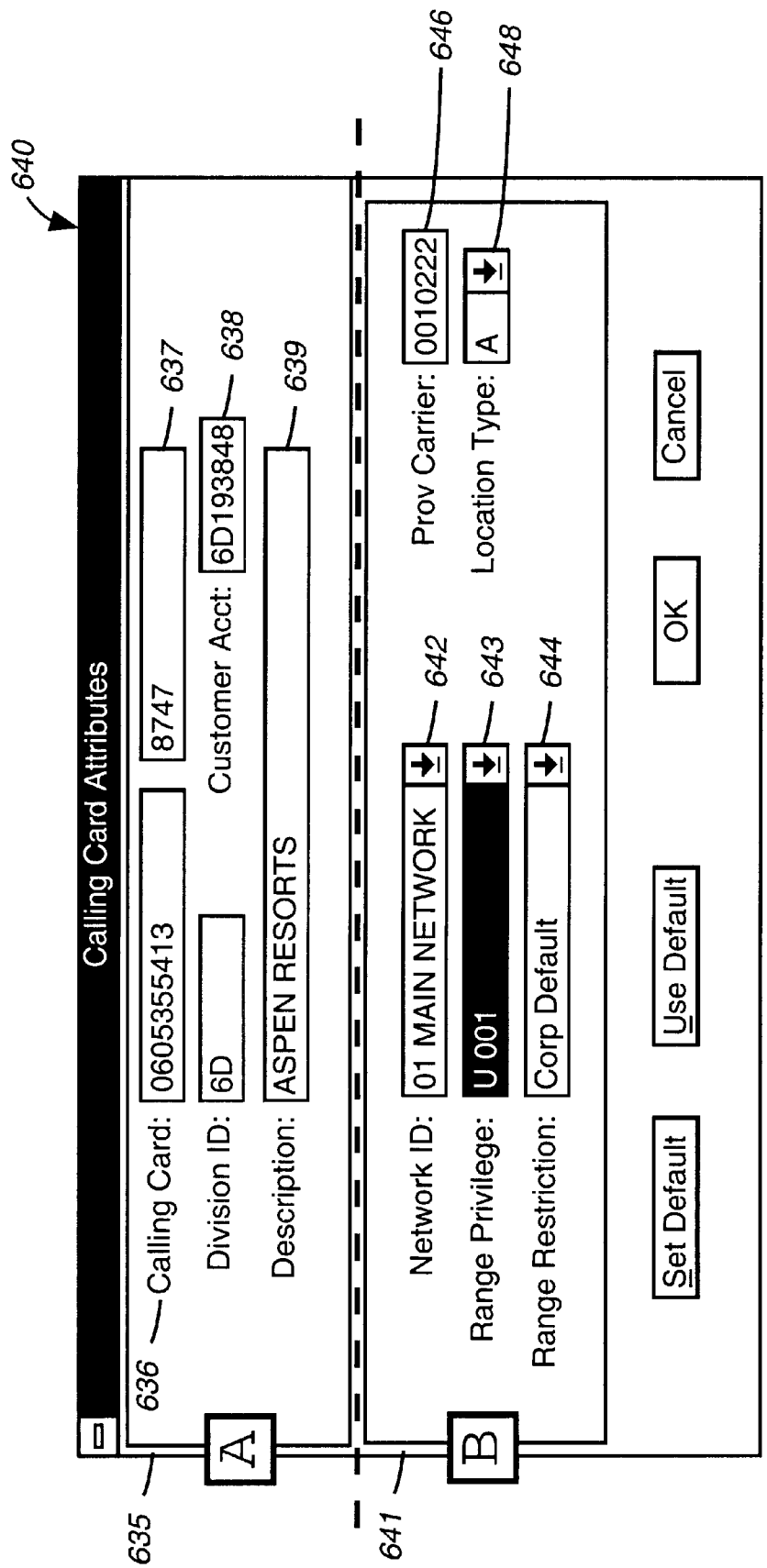
Figure 9K:
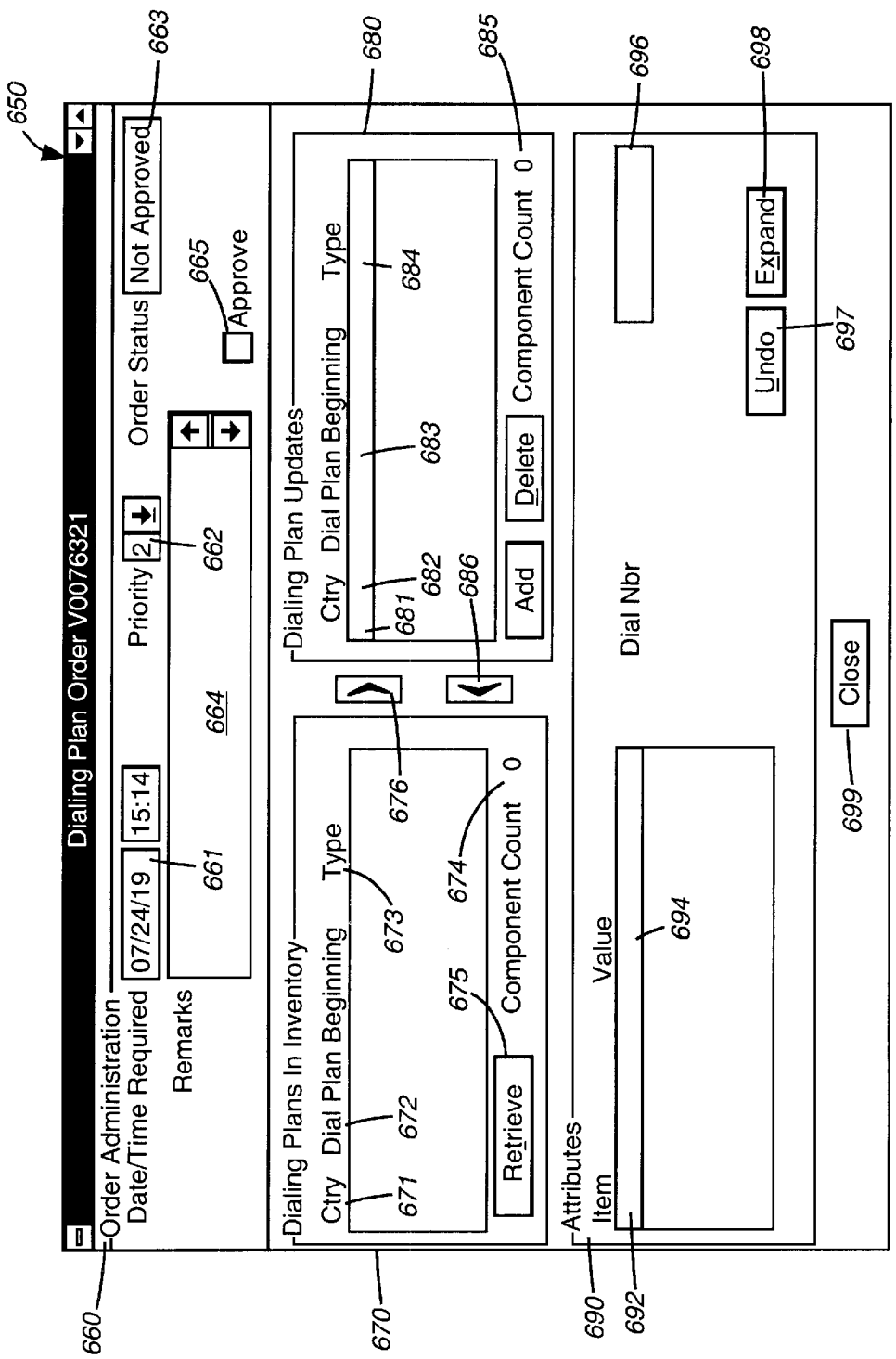
Figure 9I:
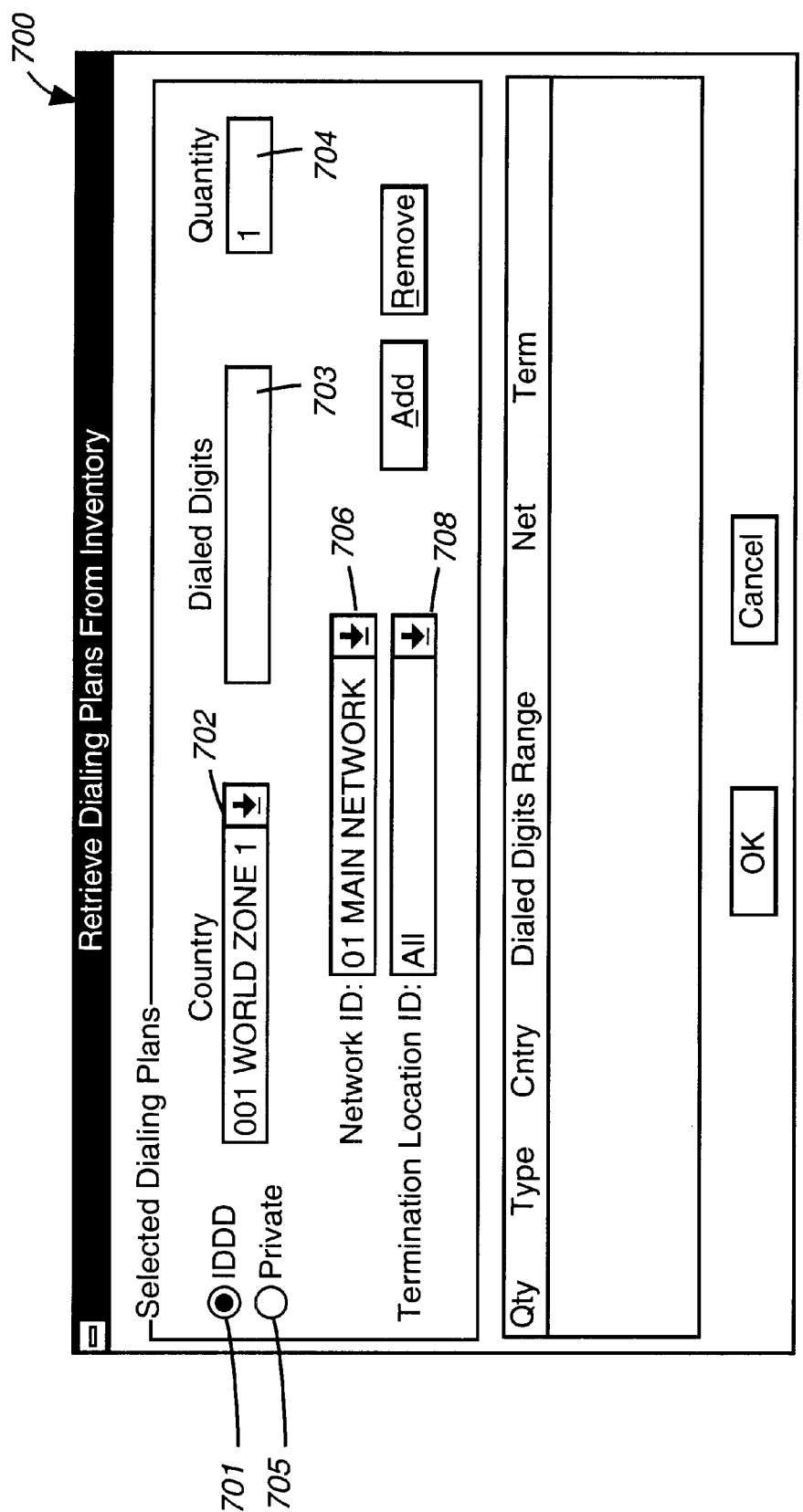
Figure 9M:
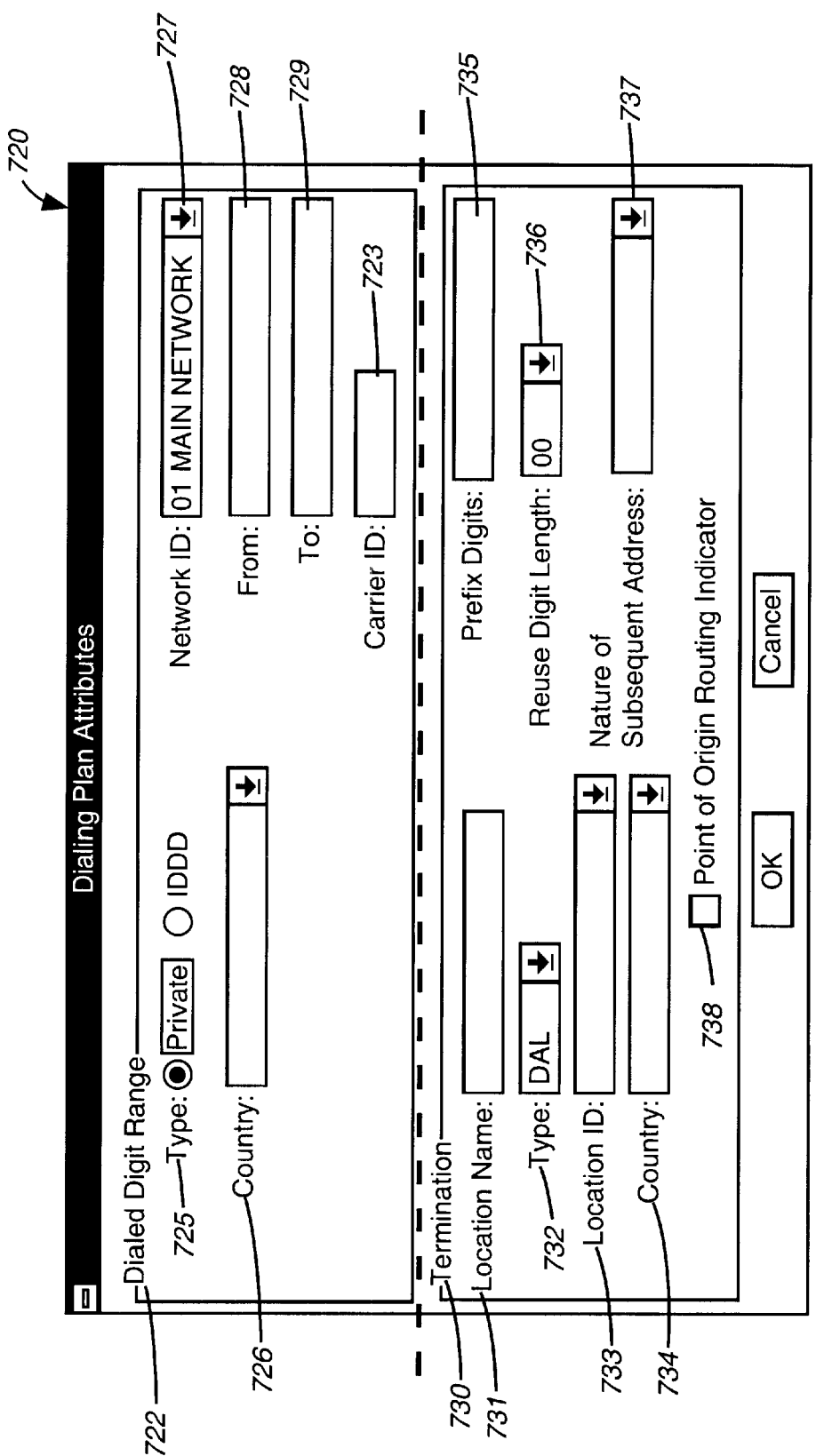

As mentioned above, selection of the CPN attributes <Expand>button 499 (FIG. 9(d)) enables a web page display of a Calling Party Number Attributes window 530, such as shown in the example web page display of FIG. 9(g). From this window, a customer may "view only" CPN attributes or features, if the selected CPN is located in the CPNs in Inventory section of the CPN order window, or, view or modify attributes if the selected CPN is in the CPN Updates section.

As shown in the example web page display of FIG. 9(g), a first section referred to as the CPN information section 540 comprises view only fields presenting information such as: a three digit country code field 541 which identifies the country of origin for this CPN; a "From" field 542 indicating the beginning number of a possible range of CPNs affected by this CPN Order; a "To" field 543 indicating the last number of a range of numbers affected by this CPN Order; a Customer Account field 544; a Division ID field 545; a Description field 546 describing the CPN(s); and, a yes or no Cellular field 547 indicating whether this CPN originates from a cellular phone. Additionally, a second section referred to as the CPN feature information section 550 comprises the following field/command buttons including: a Network ID field 552 obtained from the drop-down list by selecting the down arrow; a Range Privilege field 553 for selecting the Range Privilege (customized or universal) to be linked to this Calling Card from the drop-down list by selecting the down arrow; an ID Code Set field 554 for selecting an ID Code Set to be associated with this CPN from the drop-down list by selecting the down arrow. When an ID Code Set is chosen, nMCI Interact ONM automatically populates the ID Code Length; a Supp Code Collection field 555 enabling selection from the drop down list to indicate when ID and/or accounting codes will be collected for this CPN. A tone will prompt callers to enter code(s) after the dialed number. Selections include: 0—Do not collect Supplemental Codes; 1—Collect Supplemental Codes for all numbers; 2—Collect Supplemental Codes on all calls except 7-digit Private On-Net Numbers; 3—Collect Supplemental Codes only for international Off-Net numbers; 4—Collect Supplemental Codes for all Off-Net numbers; a Data Indicator field 556 enabling a user to denote data versus voice traffic by selecting from the drop-down list; a Prov Carrier 557 indicating the provisioning carrier (MCI or Stentor) associated with the CPN, in the format of Country Code, padded to three digits with leading zeros, and the 4-digit Carrier Code; a Location Type field 558 which may be selected by clicking on the down arrow to activate the drop down list; an ID Code Length field 559 which is autopopulated with a 2-digit number according to the ID Code Set selected; an Account Code Length field 560; and, <Set Default>, <Use Default>, <OK>and <Cancel>option buttons, as described herein.

When opening an existing Calling card order, the nMCI Interact ONM system Calling Card Order option allows a customer to "link" or attach network features to a Calling Card(s) that exist in that customer's inventory, i.e., Calling Cards that are active in that customer's database, or link network features to a new calling card. The following features can be defined/linked to Calling Cards: 1) Multiple Networks; 2) Range Privileges including Universal and Customized; Range Restrictions including Corporate and Custom; and Extended Enterprise (Location/Access Type).

FIG. 9(*h*) illustrates an example web page 570 comprising a Calling Card order window comprising the following sections: 1) an order administration section 580 for providing administrative aspects of the Calling Card order such as: enabling entry of a date/time when the order is to be implemented by the host; selecting a priority based on the user's security access privilege; establishing an order status, e.g., approved or not approved for new orders in accordance with a users authorization; 2) a Cards in Inventory Section 590 used to retrieve Calling Cards from inventory that are not included on another order. This is accomplished by selection of the retrieve button 595 and enables display of, inter alia, the Calling card numbers and associated PINs, a description assigned to the calling card, and a component count; 3) a Card updates section 600 which populates the calling card order window by moving selected calling cards from the cards in inventory section or by adding new calling cards to the current order; and, 4) an attributes section 610 for populating an area 612 of the screen display with a list of attributes, or features, for a selected calling card in the inventory or updates section.

With more particularity, the Calling Card order administration section 580 of web page display 570 comprises the same field descriptions as mentioned herein with respect to the CPN order administration including: 1) a set date/time field 582 for when the calling card order is to be implemented by the host; 2) a priority field 584 for establishing calling card order priority (depending on security access privileges); 3) a current order status field 586; 4) a Remarks text field 589 optionally used to describe the contents of the Calling card order; and, 5) an Approve field 588 such that when checked, indicates the order is approved and transmitted to the host.

The Calling Card inventory section 590 used to retrieve a Calling Card(s) from the Calling Card inventory comprises the following field/command button descriptions: a Card Nbr-PIN field 592 that displays the Calling Card number and associated PIN if the user has security access to view the PINS; a Description field 594 which comprises a description assigned to the Calling Card, e.g., the employee or company name; a Component Count field 596 indicating how many Calling Cards are within the Calling Cards Inventory section; a Retrieve button 595 such that, when selected, retrieves a list of a customer's available Calling cards in inventory that are not included in other orders. Selection of this option will enable a web page display of a Retrieve Calling Cards from Inventory Window 620 such as shown in FIG. 9(*i*); and, a right arrow ">" command button 598 enabling a customer to move single or multiple (selected) Calling Cards from the Calling Cards in inventory section to the Calling card Updates to include on the current order.

The Calling card updates section 600 comprises the same field/command button descriptions as mentioned herein with respect to the CPN order administration including: a status code indication 601 displayed next to a Calling card having the same designations, i.e., no status, "A", "C", and "D"; a Card Nbr-PIN field 602, a Description field 603 and, a Component Count field 604 as described above; a left arrow "<" command button 605 enabling a customer to remove a Calling card from the current order, and to restore its attributes back to those that were last transmitted to the host, i.e., move one or more highlighted Calling cards to the Calling cards in Inventory section; an "Add" command button, e.g., only displayed for Stentor customers; and, a "Delete" command button.

The Calling Card attributes section 610 comprises the same field/command button descriptions as mentioned herein with respect to the CPN order administration including: a table 612, including an "Item" field 611 comprising those Vnet/Vision feature items that are listed in this column once linked to Calling cards, e.g., Range Privilege, Location type, etc.; a "Value" field 613; a "Card Nbr" field 614 which designates the information displayed in the Attributes section is for the selected Calling card, which can be either in the Calling card In Inventory or Calling cards Updates sections; a <Set Dflt>button 615 which enables a customer to define the PC default for Calling card attributes. Once set, the PC default values can be applied to other Calling cards by selecting the <Use Dflt>button 616 which command provides the option of applying either the host default or the user-defined PC default attributes for the selected Calling card; an <Undo>button 617; an <Expand>button 618 enabling the display of the Calling Card Attributes window, such as shown in FIG. 9(*j*); and a <Close>button 619 for closing the Calling card Order window.

As mentioned above, selection of the Calling card "Retrieve" button 595 in FIG. 9(*h*) enables a web page display of a Retrieve Calling cards from Inventory Window 620 such as shown in the example web page of FIG. 9(*i*). From this web page, a customer may specify search criteria or retrieve a predetermined amount of Calling cards having defaulted criteria. Particularly, the Retrieve Calling cards from Inventory Window 620 comprises the following field/command button descriptions for retrieving Calling cards from customer inventory: a Card Nbr field 621 enabling entry of a partial or whole 10-digit calling card number; a PIN field 622 enabling entry of an optional 4-digit personal identification number that is associated with the Calling Card number and can only be used in combination with Card Nbr; a Quantity field 623 enabling a customer to enter a value, from 1 to 200 per Calling card group, specifying the quantity of Calling cards to include in the retrieval; a Network ID field 624; a Range Privilege field 625 enabling a customer to select a specific Range Privilege from the drop-down list by selecting the down arrow; a Description field 626 enabling a customer to type a full or partial Calling card description as retrieval criteria; an <Add>button 627 for updating the list box with the group information from the Card Nbr, PIN, Quantity Network ID, Range Privilege, and Description edit boxes; a <Remove>button 628 enabling a customer to remove a highlighted display item so that it is not included in the retrieval request; an <OK>button 629 for accepting all entries in the Retrieve Calling cards from Inventory window, and messaging the host; and, a <Cancel>button 630 for closing the Retrieve Calling cards from Inventory window without accepting any changes.

As mentioned above, selection of the Calling card <Expand>button 618 (FIG. 9(*h*)) from the calling card attributes section enables a web page display of a Calling card Attributes window 640, such as shown in FIG. 9(*j*). From this window, a customer may "view only" calling card attributes or features, if the selected calling card is located in the Cards in Inventory section of the calling card order window, or, view or modify attributes if the selected calling card is in the Card Updates section. As shown in the web page display of FIG. 9(*j*), a first section referred to as the calling card information section 635 comprises view only fields presenting information such as: the Calling Card Number 636 and the associated PIN 637; the Customer Account number 638; and the calling card description 639 which is user-defined and accessible. Additionally, a second section referred to as the feature information section 641 comprises the following field/command buttons including: a Network ID field 642 obtained from the drop-down list by selecting the down arrow; a Range Privilege field 643 for selecting the Range Privilege (customized or universal) to be linked to the Calling Card from the drop-down list by selecting the down arrow; a Range Restriction field 644 for selecting a Corporate or Custom Range Restriction to be linked to this Called Card from the drop-down list by selecting the down arrow; a Prov Carrier field 646 which indicates the provisioning carrier (MCI or Stentor) associated with the Calling Card, in the format of Country Code, padded to three digits with leading zeros, and the 4-digit Carrier Code; a Location Type field 648 for example, host default, which, once selected, cannot be changed until the Calling Card is deactivated and reinstalled; a <Set Default>button; an <Use Default>button; an <OK>command button for returning to the Calling Card Order window; and a <Cancel>button for exiting the Calling Card Attributes window without making changes to the feature information.

In a similar manner as described above with respect to the Add New CPN web page display (FIG. 9(*e*)), a Stentor customer, if authorized, may add a new Calling Card to their inventory and assign attributes. The Add new Calling Card functionality includes: assigning a card number and associated personal identification number (PIN), adding a provisioning carrier in the format of a country code, and, adding a Calling card description. It should be understood that Calling card orders may be deleted by selecting a delete button.

When opening an existing Dialing Plan order or creating a new one, the nMCI Interact ONM system Dialing Plan Order option allows a company to define their call routing Dialing Plans to meet their business needs and manage their network costs. Thus, the nMCI Interact Outbound NM Dialing Plan order enables a customer to: 1) Create 7-digit Private Numbers that translate to Public Numbers, used for caller convenience and easy association of locations; 2) Force Public Numbers On-Net so that it is no longer routed according to Public Network rules, but rather by the customer's dialing plan; 3) Exclude a specific number, or range of Public Numbers, to control network abuse; assign specific numbers to terminate to Customized Message Announcements to provide user-defined information lines; and, establish "Hotlines" to enhance customer service by providing caller convenience and local presence.

Within a dialing plan order, a user may specify the origination, or dialed digit range (the number dialed), and the termination data (where or how the call is answered, e.g., terminating to Dedicated Access Lines (DALs).

FIG. 9(*k*) illustrates an example web page comprising a Dialing Plan order window 650 comprising the following sections: 1) an order administration section 660 for providing administrative aspects of the Dialing Plan order such as: enabling entry of a date/time when the order is to be implemented by the host; selecting a priority based on the user's security access privilege; establishing an order status, e.g., approved or not approved for new orders in accordance with a users authorization; 2) a Dialing Plans in inventory section 670 used to retrieve Dialing Plans from inventory that are not included on another order. This is accomplished by selection of the retrieve button 675 and enables display of the country codes associated with the Dialing Plan; display of the dial plan single number or beginning number within a range; a termination type for the dialing plan; and, a component count indicating the amount of dialing plans that are in the inventory section; 3) a Dialing Plan updates section 680 for populating the dialing plan order window by moving selected dialing plans from the Dialing Plan inventory section or by adding new dialing plans to the current order; and, 4) an attributes section 690 for populating an area of screen display 650 with a list of attributes, or features, for a selected dialing plan in the inventory or updates section.

With more particularity, the Dialing Plan order administration section 660 of example web page display 650 comprises the same field descriptions as mentioned herein with respect to the CPN order administration including: 1) a set date/time field 661 for when the dialing plan order is to be implemented by the host; 2) a priority field 662 for establishing dialing plan order priority (depending on security access privileges); 3) a current order status field 663; 4) a Remarks text field 664 optionally used to describe the contents of the Dialing Plan order; and, 5) an Approve field 665 such that when checked, indicates the order is approved and transmitted to the host.

The Dialing Plans in Inventory section 670 used to retrieve Dialing Plan(s) from the Dialing Plan inventory comprises the following field/command button descriptions: a Ctry field 671 that displays the Dialing Plan's country code; a Dial Plan Beginning field 672 indicating the remaining digits of the Dialing Plan number of beginning number within a range; a type field 673 indicating the termination type for the dialing plan; a Component Count field 674 indicating how many Dialing Plans are within the Calling Cards Inventory section; a Retrieve button 675 such that, when selected, retrieves a list of a customer's available Dialing Plans in inventory that are not included in other orders. Selection of this option will enable a web page display having a Retrieve Dialing Plans from Inventory Window 700 such as shown in FIG. 9(*l*); and, a right arrow ">" command button 676 enabling a customer to move single or multiple (selected) Dialing Plans from the Dialing Plans in inventory section to the Dialing Plan Updates to include on the current order.

The Dialing Plan updates section 680 comprises the same field/command button descriptions as mentioned herein with respect to the CPN updates section including: a status code indication 681 displayed next to a Dialing Plan having the same designations, i.e., no status, "A" (added), "C" (changed), and "D" (deleted); a Ctry field 682, a Dial Plan Beginning field 683, a termination "type" field 684, and, a Component Count field 685 as described above; a left arrow "<" command button 686 enabling a customer to remove a Dialing Plan from the current order, and to restore its attributes back to those that were last transmitted to the host, i.e., move one or more highlighted Dialing Plans to the Dialing Plans in Inventory section; an "Add" command button enabling entry of new Dialing Plan record(s); and, a "Delete" command button for deleting Dialing Plan records.

The Dialing Plan attributes section 690 comprises the same field/command button descriptions as mentioned herein with respect to the CPN attributes section including: an "Item" field 692, e.g., Network ID; a "Value" field 694; a "Dial Nbr" field 696 which designates the information displayed in the Attributes section is for the selected Dialing Plan, which can be either in the Dialing Plans In Inventory or Dialing Plan Updates sections; an <Undo>button 697; an <Expand>button 698 enabling the display of the Dialing Plan Attributes window, such as shown in FIG. 9(*m*); and a <Close>button 699 for closing the Dialing Plan Order window.

As mentioned above, selection of the Dialing Plan "Retrieve" button 675 in FIG. 9(*k*) enables a web page display of a Retrieve Dialing Plans from Inventory Window 700 such as shown in the example web page of FIG. 9(*l*). From this display, a customer may specify search criteria or retrieve a predetermined amount of Dialing Plans having defaulted criteria. Particularly, the Retrieve Dialing Plans from Inventory Window 700 comprises the following field/command button descriptions for retrieving Dialing Plans from customer inventory: an International Direct Dialed Digits "IDDD" radio button 701 enabling entry of dialed digits as a public number in a dialed digits field 703. When IDDD is selected, the user is required to designate a Country Code in a Country field 702; a Private radio button 705 enabling entry of a Private Number in the Dialed Digits field when selected. The Country field is protected when this type of dialed digits is selected; a Country field 702 that must be selected from the drop-down list when IDDD is selected as the type of dialed digits; a dialed digits field 703 enabling entry of a partial or whole number (dialed digits) not including the Country Code); a Quantity field 704 enabling a customer to enter a value, from 1 to 100, specifying the quantity of Dialing Plans to include in the retrieval; a Network ID field 706; a Termination/Location ID field 708 indicating the Location ID of a DAL which can be selected from the drop-down list (if available within the customer's network); an <Add>button for updating the list box in the selected dialing plans section with the group information from the IDDD, Private, Country (only when IDDD is selected), Dialed Digits, Quantity, Network ID and Termination Location ID edit boxes, where applicable; a <Remove>button enabling a customer to remove a highlighted display item so that it is not included in the retrieval request; an <OK>button for accepting all entries in the Retrieve Dialing Plans from Inventory window, and messaging the host; and, a <Cancel>button for closing the Retrieve Dialing Plans from Inventory window without accepting any changes.

As mentioned above, selection of the Dialing Plan <Expand>button 698 from the Dialing Plan attributes section enables a web page display of a Dialing Plan Attributes window 720, such as the example web page display shown in FIG. 9(*m*). From this display, a customer may view Dialing plan attributes or features, if the selected dialing plan is located in the Dialing Plans in Inventory section of the Dialing Plans Order window, or, view or modify attributes if the selected calling card is in the Dialing Plan Updates section.

As shown in the web page display of FIG. 9(*m*), a first section referred to as the Dialed Digit Range section 722 comprises fields/command buttons enabling a customer to define the origination data (number dialed) for a dialing plan. The field/command buttons include: "type" radio buttons 725 enabling the selection of the originating number as a private number or public number (IDDD); a country field 726 for enabling entry of a country code from a drop-down list when IDDD is selected as the dialed digit type; a network ID field 727 enabling entry of a network in which a new Dialing plan is defined; a "From" field 728 enabling entry of a beginning number of a range of numbers; a "To" field 729 enabling entry of a last number of a range of numbers; a Carrier ID field 723 which is an optional entry for numbers defined in the Dialing Plan order that are only completed by the DAP if originated by the specified Carrier Code within that originating country, and, that are only entered when a Country and Carrier Code is specified.

As shown in the example web page display of FIG. 9(*m*), a second section referred to as the Termination section 730 comprises fields/command buttons enabling a customer to define the termination data for a dialing plan. The field/command buttons include: location name field 731 which is an alphanumeric field enabling entry of a description of the termination, e.g., company name or location; a type field 732 enabling selection from a drop-down list of the following termination types to which the Private or Public Number sends the call: a DAL—used for Dedicated Access Lines, an IDDD—used for all Public Numbers, a CMA—used for Customized Message Announcements, and, a EXCL—used to exclude a number or range of numbers; a Location ID field 733 of a Dedicated Access Line (DAL) which can be entered (e.g., Shared DALs) or selected from the drop-down list. If the termination type is "DAL," a section/entry is required; a Country field 734 for selection of the Country Code (where call will terminate) from the values in the drop-down list and is required entry when "IDDD" is the termination type; a Prefix Digits field 735 for entering the numbers at the beginning of the terminating number (not including the Country Code) which are the same for all numbers in a range, or the entire terminating number when entering individual numbers; a Reuse Digit Length field 736 enabling entry of the number of digits from the dialed digits that will be reused in the terminating number when used in a range with Prefix Digits. This field displays the default value, e.g., "00", and is protected when terminating numbers are entered individually or when the termination type is CMA or EXCL. When a value is required, it can either be typed in or selected from the drop-down list; a Nature of Subsequent Address field 737 enabling entry of the out pulse digits delivered to a customer's equipment (CPE). When the termination type is a DAL, the default is changed from "None" to any of the other selections. However, "Subscriber" is typically selected, as "National" and "International" would only be used by a private network owner; a Point of Origin Routing Indicator check box 738 to indicate Point of Origin Routing which enables a customer to designate an alternate DAL, that overrides the DAL specified in that customer's Dialing Plan, based on the originating switch. This helps to manage load balancing for DALS, e.g. for Vnet; and, an <OK>button and a <Cancel>button for closing the Dialing Plan Attributes window without making changes to the feature information.

When opening an existing ID Code/Set order or creating a new one, the nMCT Interact ONM system ID Code/Set Order option allows a customer to define a unique 1–11 digit number ID Code and assign that number to an individual. ID Codes preferably have a range privilege assigned to them, therefore, a customer can tailor calling privileges and assign them to individuals via their ID Code. Once an ID Code system is established, the code is entered after the dialed number on every call made. It should be noted that the network DAP switches (FIG. 6) verifies ID Codes. Thus, a correct ID Code must be entered or the MCI switch will not complete the call. In the preferred embodiment, there are two types of ID Code Set Orders in nMCI Interact Outbound NM: 1) Add/Change ID Code Set Order; and 2) Delete ID Code Set Order.

In the preferred embodiment, the Add/Change ID Code Set Order enables a customer to perform the following functions to implement ID Codes within that customer's Vnet/Vision Network: 1) Define ID Code Length (1–11 digits); 2) Assign Range Privileges to ID Codes; 3) Define Local Sets; 4) Generate ID Codes Sequentially or Randomly to an ID Code Set; 5) Individual Entry of ID Codes; and 6) Modify/Delete ID Codes within a Set.

Figure 9N:
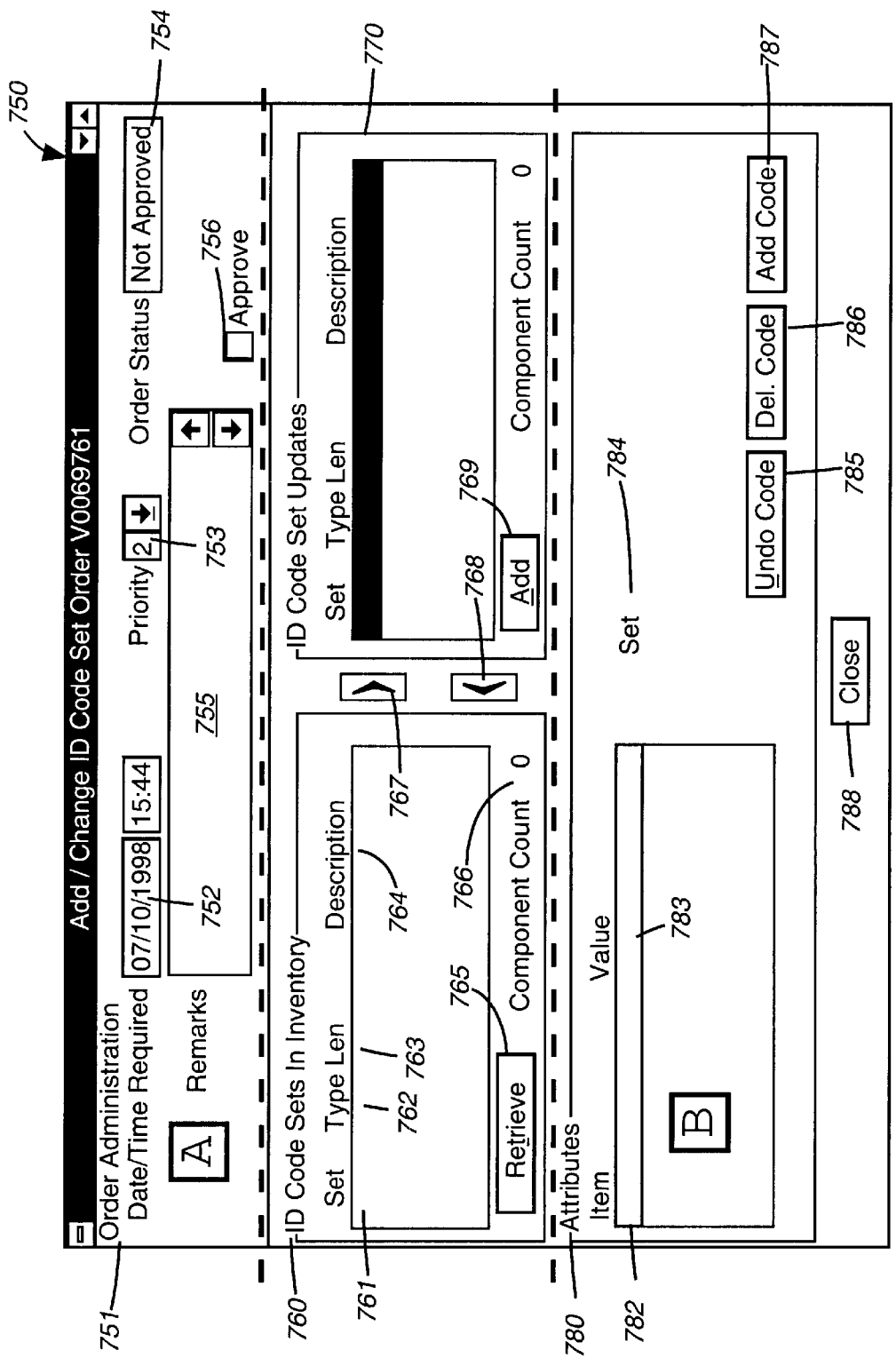

FIG. 9(n) illustrates an example web page 750 comprising an Add/Change ID Code Set Order Window comprising the following sections: 1) an order administration section 751 for providing administrative aspects of the order such as: enabling entry of a date/time when the order is to be implemented by the host; selecting a priority based on the user's security access privilege; establishing an order status, e.g., approved or not approved for new orders in accordance with a users authorization; 2) an ID Code Sets in Inventory section 760 used to retrieve ID Code Sets from inventory that are not included on another order. This is accomplished by selection of the retrieve button 765 and enables display of the ID Code Set details including: ID Code, Set ID, set types, defined ID Code length; a description of the ID Code Set, e.g., by location; and, a component count indicating the amount of ID Code Sets in the ID Code/Sets inventory section; 3) an ID Code Set Updates Section 770 for populating the ID Code/Set order window by moving selected ID Code/Sets from the ID Code/Set inventory section or by adding new ID Code/Set to the current order; and, 4) an attributes section 780 for populating an area of screen display with a list of attributes, or features, for a selected ID Code/Set in the inventory or updates section.

With more particularity, the ID Code Set Order administration section 751 of web page display 750 comprises the same field descriptions as mentioned herein with respect to the Dialing Plan order administration including: 1) a set date/time field 752 for when the ID Code/Set order is to be implemented by the host; 2) a priority field 753 for establishing dialing plan order priority (depending on security access privileges); 3) a current order status field 754; 4) a Remarks text field 755 optionally used to describe the contents of the ID Code/Set order; and, 5) an Approve field 756 such that when checked, indicates the order is approved and transmitted to the host.

The ID Code/Sets in inventory section 760 used to retrieve ID Code/Set(s) from the ID Code/Sets inventory comprises the following field/command button descriptions: a Set field 761 indicating the ID Code/Set; a "type" field 762 having an indication of a local ("L") set or a global ("G") set; a Len field 763 indicating the defined length of the ID Code; a description field 764 indicating the description of the ID Code Set, e.g., location; a Component Count field 766 indicating how many ID Code Sets are within the ID Code Sets in Inventory section; a Retrieve button 765 such that, when selected, retrieves a list of a customer's available ID Code Sets in inventory that are not included in other orders. Selection of this option will enable a web page display having a Retrieve ID Code Sets from Inventory Window 790 such as shown in FIG. 9(o); and, a right arrow ">" command button 767 enabling a customer to move single or multiple (selected) ID Code Sets from the ID Code Sets in inventory section to the ID Code Set Updates to include on the current order.

The ID Code Sets updates section 770 comprises the above-described Set, "type," Len, description and component count fields and, a left arrow "<" command button 768 enabling a customer to move one or more highlighted ID Code Sets to the ID Code Sets in Inventory section; a "Delete" command button; and, an "Add" command button 769 enabling the addition of new ID Code Sets to the order including functionality enabling the creation of an ID Code Set which can be added to an order and which must contain at least one ID Code prior to approving the order. Adding a new Set to the order entails specification of either a local or global ID Codes sets.

Figure 9O:
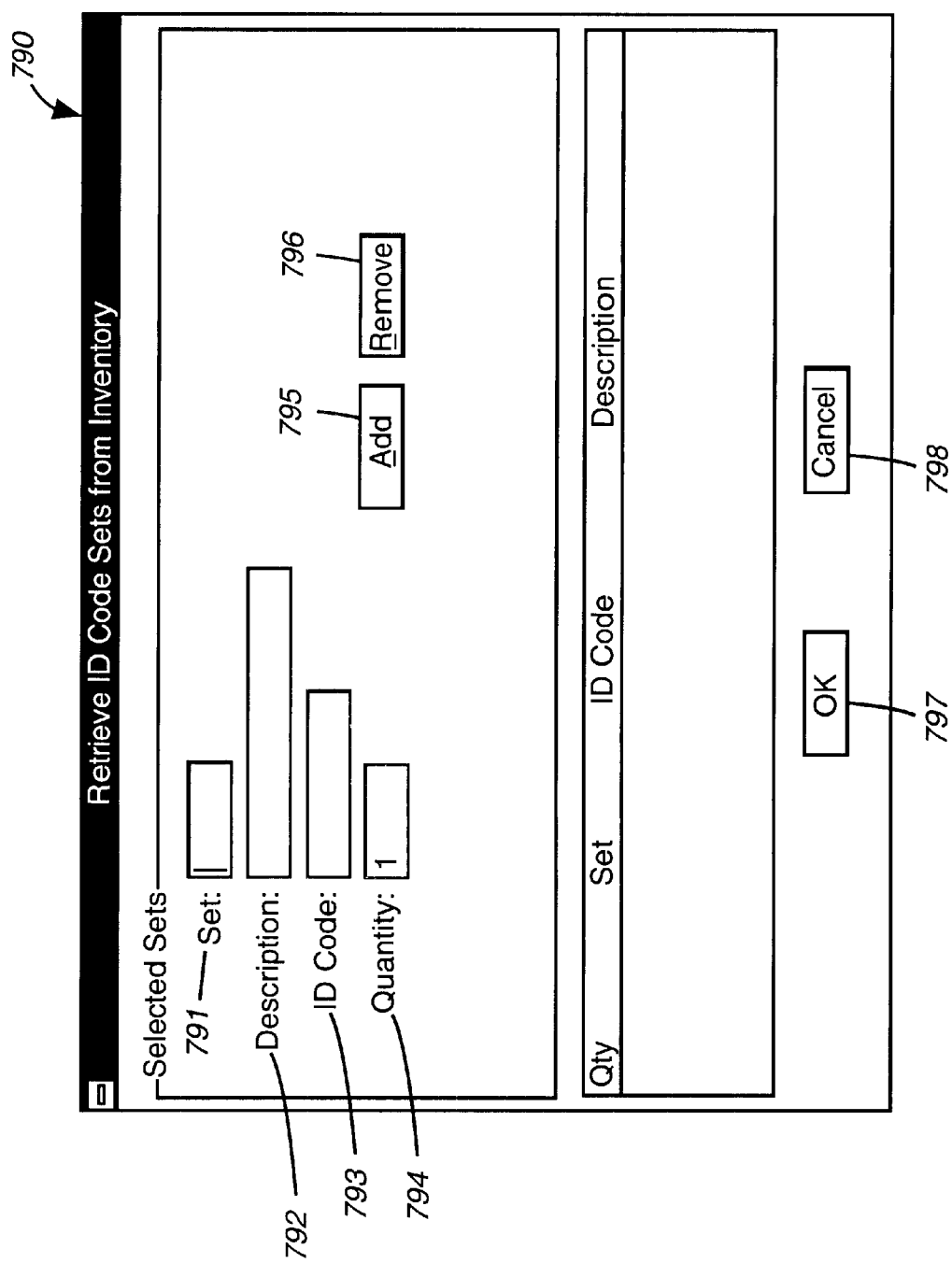
Figure 9P:
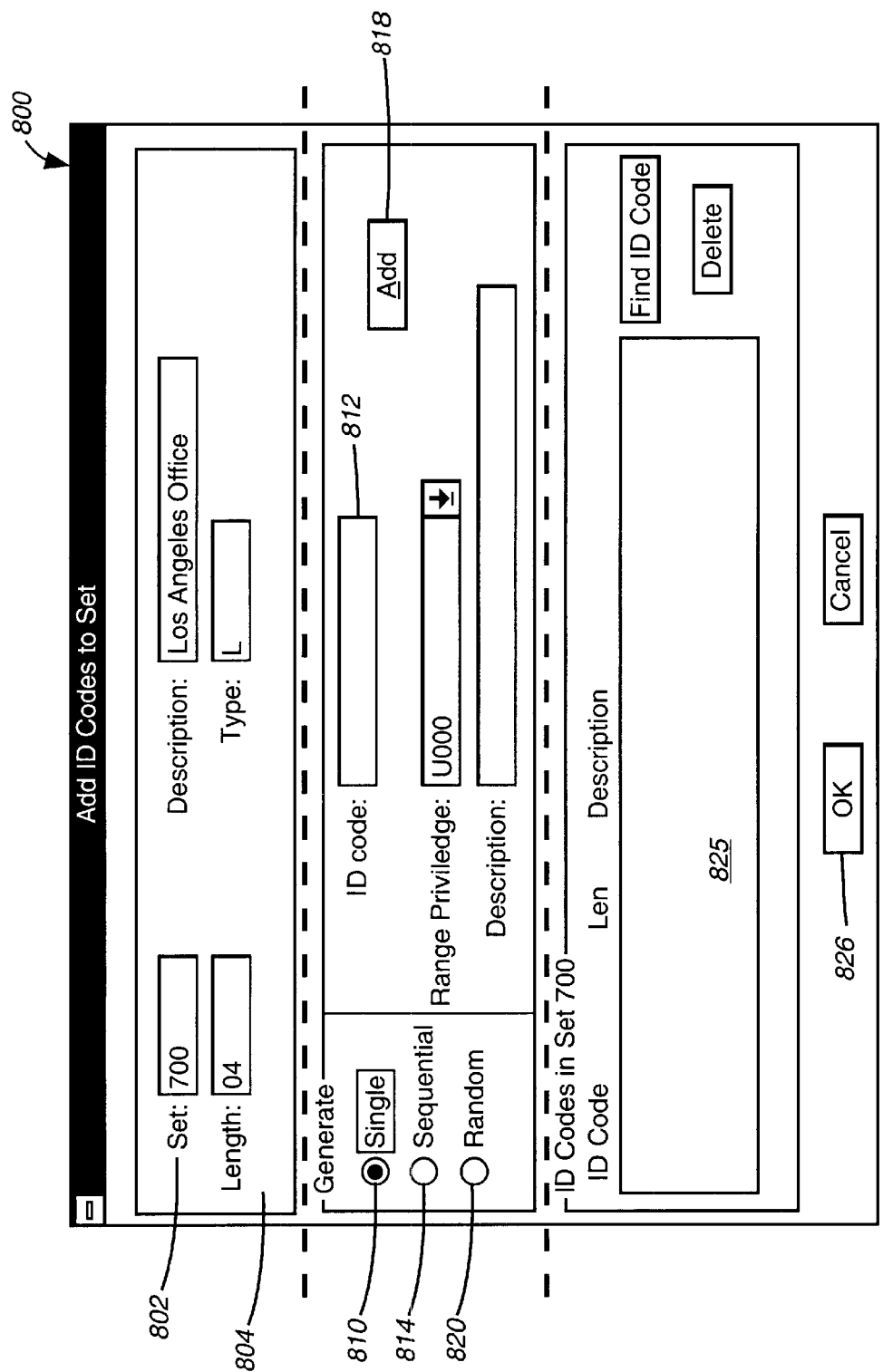

The ID Code Sets attributes section 780 comprises the same field/command button descriptions as mentioned herein with respect to the Dialing Plan attributes section including: an "Item" field 782, e.g., including ID Code Set and ID Code Information; a "Value" field 783; a "Set" field 784 which designates the information displayed in the Attributes section is for the selected ID Code Set, which can be either in the ID Code Sets In Inventory or ID Code Set Updates sections; an <Undo>button 785; a <Del Code>button 786 for deleting a selected ID Code; an <Add Code>button 787 enabling display of a further Web page including an Add ID Codes to Set window, such as shown in FIG. 9(p); and a <Close>button 788 for closing the Add/Change ID Code Set Order window.

As mentioned above, selection of the ID Code Sets "Retrieve" button 765 in FIG. 9(n) enables a web page display of a Retrieve ID Code Sets from Inventory Window 790 such as shown in the example web page display of FIG. 9(o). From this window, a customer may specify search criteria or retrieve a predetermined amount of ID Code Sets having defaulted criteria. Particularly, the Retrieve ID Code Sets from Inventory Window 790 comprises the following fields for retrieving ID Code Sets from customer inventory: a Set field 791 enabling entry of the Set number; a description field 792 enabling entry of a full or partial ID Code Set description, e.g., alphanumeric description; an ID Code field 793 enabling entry of a specific ID Code; a Quantity field 794 enabling a customer to enter a value specifying the quantity of ID Code Sets to include in the retrieval; an <Add>button 795 for updating the list box in the selected dialing plans section with the group information from the Set, Description, ID Code, and Quantity text boxes; a <Remove>button 796 enabling a customer to remove a highlighted display item so that it is not included in the retrieval request; an <OK>button 797 for accepting all entries in the Retrieve ID Code Sets from Inventory window, and messaging the host; and, a <Cancel>button 798 for closing the Retrieve ID Code Sets from Inventory window without accepting any changes.

As mentioned above, selection of the Add Code button 787 in FIG. 9(n), enables display of the Add ID Codes to Set window such as shown in the example Add ID Codes to Set web page 800 of FIG. (p). As shown in FIG. 9(p), the Add ID Codes to Set window 800 enables the customer to delete ID codes from a set; add ID codes one at a time, e.g., single generation; sequentially generate ID Codes to the Set; and randomly generate ID Codes to the Set. For instance, the customer may enter the set information in the following fields: the Set field 802 for which the ID Code changes will take effect; a length field 804 setting forth the length of the ID Codes contained in the set; a description field enabling entry of text describing the set; and a type field indicating the set as local or global. With regard to the ID Codes generate options, a single generate option 810 enables a user to add ID Codes one at a time to a set, e.g. by entering the number in the ID Code field 812; a sequential generate option 814 enables the user to specify a beginning ID Code number and a Quantity in entry fields (not shown). The nMCI Interact ONM will automatically generate sequential ID codes according to the quantity specified by selecting the Add button 818 which updates a list box 825 with information from the generated id Codes; and, a random generate option 820 enables the user to specify a beginning ID Code number, an ending ID Code number, and, a Quantity in entry fields (not shown). The nMCI Interact ONM will randomly-generate the specified number of ID codes within the beginning and ending range by selecting the Add button 818 to update list box 825. Selection of the <OK>button 826 will enable acceptance of all the newly generated ID Code entries, messaging the host of the new codes, and, returning control to the Add/Change ID Code Set order page (FIG. 9(*n*)).

As mentioned above with respect to FIG. 9(*a*) depicting the nMCI Interact ONM web page display 294, the control menu option 420 provides a refresh option which enables an update of all internal lists that have been altered on the host NetCap system. Specifically, the nMCI Interact ONM system 200 updates the following lists: the network ID, Range Privilege, ID Code Set, Billing Location ID, Customer Service ID, location/access type, and, provisioning carrier. It should be understood that Refresh option will not change the values of an open window that includes data from one of the lists.

Furthermore, with respect to the report menu option 422 provided in the main web page display of FIG. 9(*a*), users are enabled to inquire on their respective inventory for CPNs, Calling Cards, Dialing Plans, and ID Code Sets. The ONM system will display respective "Retrieve" item from inventory, e.g., election of report option for CPNs enables the display of the Retrieve CPNs from inventory screen as shown in FIG. 9(*f*). Particularly, in the ONM system 200, four inventory reports may be provided to customers: CPN, Calling Card, Dialing Plan, and ID Code Set. Reports may be requested from the screen display of FIG. 9(*a*), however, will be delivered to the nMCI Interact Inbox message center 31 (FIG. 6), for client viewing and retrieval in the manner as described in co-pending U.S. patent application Ser. No: 09/159,512 entitled MULTI-THREADED WEB BASED USER IN-BOX FOR REPORT MANAGEMENT, the contents and disclosure of which is incorporated by reference as if fully set forth herein.

Referring back to FIG. 6, once the customer has logged into ONM system 200 and has received the StarOE security message, a communication 251 is made from the ONM server 250 to NetCap 240 requesting a user security profile. Particularly, the messaging system implemented for all communications between the ONM server and NetCap is referred to herein as "Registry", such as shown and described in commonly-owned, co-pending U.S. patent application Ser. No. 08/560,550 now U.S. Pat. No. 5,790,809, the contents and disclosure of which are incorporated by reference as if fully set forth herein.

In the preferred embodiment, as shown in FIG. 6, the ONM server 250 communicates a logon message 251 via Registry messaging to NetCap. Via the ONM Client Application, the user is now able to initiate invocation of the various ONM orders, e.g., CPN, Calling Card, Dialing Plan, and ID Code/Sets orders, depicted in FIG. 6 as HTTPS order request messages 222, 224 pertaining to that customer's Vnet/Vision network(s).

When a user desires to view, modify or create a Vnet/Vision Order from the ONM screen, the ONM Client application causes the instantiation of an "Order Manager" object which invokes methods capable of accessing all the information pertaining to orders for a given user access privilege. As described herein, an order comprises two components: 1) the order administration record comprising data such as: order status, effective data time and order number, etc.; and, 2) order administration detail record which includes the detailed information pertaining to that order, e.g., effective dates/times etc. for an order, etc. The Order Manager object includes various sub-classes which know about the various orders, e.g., CPN, Dialing Plan, functionality, and invokes objects to obtain order records, pertaining to these.

As shown in FIG. 6, the customer's Send request 222 is communicated over the HTTPS connection as a request to invoke methods in the Order Manager class/sub-classes via CORMI. Once the plan has been submitted to the ONM server via the send message 222, the ONM server receives the order information for the particular Vnet/Vision outbound network management feature, and verifies the user's security with NetCap. Once the user's security has been verified, the ONM server submits the request to NetCap 240 via Registry messaging. Particularly, the Order Manager classes/sub-classes execute methods for translating the order in a form suitable for submission to NetCap.

The foregoing merely illustrates the principles of the present invention. Those skilled in the art will be able to devise various modifications, which although not explicitly described or shown herein, embody the principles of the invention and are thus within its spirit and scope.

What is claimed is:

1. A Web/Internet based telecommunications network management system for managing customer's outbound telecommunications network assets via a client browser application resident at a client workstation, said system comprising:

at least one authentication secure server for managing secure client sessions over the Internet, said authentication server supporting a first secure socket connection enabling encrypted communication between said browser application client and said authentication secure server, said authentication secure server configured to validate said browser application client;

a dispatch server for communicating with said authentication secure server through a first firewall over a second socket connection, said first firewall including port specific filtering routers, said first and second socket connections forming a secure communications link;

at least one application secure server for communicating with said dispatch server through a second firewall, said at least one application server providing application services which may be requested by said browser application client, said first and second firewalls effectively forming an access restriction zone for preventing unauthorized access to said at least one application server;

network configuration device for maintaining an inventory of a customer's outbound telecommunications network assets; and, outbound network manager for receiving customer directives communicated over said secure communications link, said directives including a request to access inventory pertaining to that customer's outbound network management assets, and downloading details of said outbound network management assets to customers over said secure communications link for visual presentation at said client workstation.

2. The interactive Web/Internet based network management system as claimed in claim 1, further including means for modifying said outbound network management assets via said client browser and uploading outbound network management asset modification directives to said outbound network manager over said secure communications link, wherein said outbound network manager translates said received modification directives into commands for input to said network configuration device and forwarding said commands to said network configuration device.

3. The interactive Web/Internet based network management system as claimed in claim 2, wherein a customer's outbound telecommunications network asset capable of being modified includes customer's calling party numbers.

4. The interactive Web/Internet based network management system as claimed in claim 2, wherein a customer's outbound telecommunications network asset capable of being modified includes customer's calling card numbers.

5. The interactive Web/Internet based network management system as claimed in claim 2, wherein a customer's outbound telecommunications network asset capable of being modified includes dialing plan details.

6. The interactive Web/Internet based network management system as claimed in claim 2, wherein a customer's outbound telecommunications network asset capable of being modified includes one or more customer ID Codes associated with a customer having corresponding pre-specified user range privileges.

7. The interactive Web/Internet based network management system as claimed in claim 1, wherein said outbound network management assets pertain to a customer's virtual network.

8. The interactive Web/Internet based network management system as claimed in claim 1, wherein said customer directives are communicated over said secure communications link to said network manager by remote method invocation-like protocol.

9. A method for remotely configuring a customer's telecommunications network via a Web/Internet based integrated interface, said integrated interface including a client browser application located at a client workstation for enabling interactive Web based communications between said customer and said integrated interface, said method comprising:

managing a client session over the Web/Internet by providing a first server device capable of supporting a first secure socket connection enabling encrypted communication between said browser application and said first server device;

providing a second server device for communicating with said first server device through a first firewall over a second socket connection, said first firewall including port specific filtering routers, said, first secure and second socket connections forming a secure communications link;

providing at least one third server device for communicating with said second server device through a second firewall over a third socket connection; said first and second firewalls effectively forming an access restriction zone for preventing unauthorized access to said at least one third server device;

maintaining an inventory of a customer's outbound telecommunications network assets;

communicating customer request messages for accessing details pertaining to said customer's outbound telecommunications network assets over said secure communications link; and downloading said outbound telecommunications network assets as response messages to customers over said secure communications link for visual presentation at said client workstation.

10. The method as claimed in claim 9, further including the step of enabling customer modification of said outbound telecommunication network assets via said integrated interface and up-loading modification directives over said secure communications link to an outbound telecommunications network manager for receiving said directives, and translating said modification directives into a format capable of configuring said customer's outbound telecommunications network.

11. The method as claimed in claim 10, further including the step of forwarding said modified outbound telecommunication network assets to a device for configuring said customer's outbound telecommunications network according to said modification directives.

12. The method as claimed in claim 11, further including the step of providing an interface with network control elements capable of configuring a customer's outbound telecommunications network.

13. The method as claimed in claim 12, wherein said customer directive includes an order to modify an existing outbound telecommunications network asset at a predefined time.

14. The method as claimed in claim 13, wherein a customer's outbound telecommunications network asset capable of being modified includes customer's calling party numbers.

15. The method as claimed in claim 13, wherein a customer's outbound telecommunications network asset capable of being modified includes customer's calling card numbers.

16. The method as claimed in claim 13, wherein a customer's outbound telecommunications network asset capable of being modified includes dialing plan details.

17. The method as claimed in claim 13, wherein a customer's outbound telecommunications network asset capable of being modified includes one or more customer ID Codes associated with a customer having corresponding pre-specified user range privileges.

* * * * *